US008225250B2

(12) United States Patent
Yamazaki et al.

(10) Patent No.: US 8,225,250 B2
(45) Date of Patent: Jul. 17, 2012

(54) CONNECTION CONSISTENCY CHECK PROCESSING METHOD, CABLE SELECTION PROCESSING METHOD, DESIGN CONFIRMATION PROCESSING DEVICE AND RECORDING MEDIUM THAT RECORDS DESIGN CONFIRMATION PROCESSING PROGRAM

(75) Inventors: Toshiya Yamazaki, Kawasaki (JP); Toshiro Okada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 400 days.

(21) Appl. No.: 12/458,840

(22) Filed: Jul. 23, 2009

(65) Prior Publication Data

US 2009/0293027 A1 Nov. 26, 2009

Related U.S. Application Data

(63) Continuation of application No. PCT/JP2007/051467, filed on Jan. 30, 2007.

(51) Int. Cl.
*G06F 17/50* (2006.01)
(52) U.S. Cl. ......... 716/106; 716/107; 716/111; 716/136
(58) Field of Classification Search .......... 716/104–107, 716/111, 126, 136–137
See application file for complete search history.

(56) References Cited

U.S. PATENT DOCUMENTS

| 5,038,294 | A | * | 8/1991 | Arakawa et al. ............. 716/126 |
| 5,990,891 | A | | 11/1999 | Fukaya |
| 6,505,338 | B1 | | 1/2003 | Suzuki et al. |
| 2003/0070154 | A1 | | 4/2003 | Suzuki et al. |

FOREIGN PATENT DOCUMENTS

| JP | 10-154055 | 6/1998 |
| JP | 2000-123064 | 4/2000 |
| JP | 2001-053780 | 2/2001 |
| JP | 2004-287585 | 10/2004 |

OTHER PUBLICATIONS

International Search Report for PCT/JP2007/051467, mailed Mar. 13, 2007.
English Translation of the International Preliminary Report on Patentability and Written Opinion issued Aug. 4, 2009, and mailed Aug. 13, 2009 for corresponding International Application No. PCT/JP2007/051467, filed Jan. 30, 2007.

* cited by examiner

*Primary Examiner* — Paul Dinh
(74) *Attorney, Agent, or Firm* — Staas & Halsey LLP

(57) ABSTRACT

A device is provided with a unit that stores shape and state characteristics of connectors, their electric characteristics, a judging equation to judge whether their connections are good or not, and information defined in script; and a unit that stores information defined in script of transfer functions to transfer the electric characteristics and the judging equation along a cable, wherein the connection consistency of the cable to connect connectors of the components is checked by analyzing characteristics of each connector, and scripts of the judging equation and the transfer functions; and a suitable cable candidate is selected and a processing is achieved by making use of scripts and an algorism unified for connectors and cables with various characters.

9 Claims, 19 Drawing Sheets

|        | 802. 3i | 802. 3u | 802. 3ab |
|--------|---------|---------|----------|
| 802. 3i  | O | × | × |
| 802. 3u  | × | O | × |
| 802. 3ab | × | × | O |

|  | MDI | MDX | MDI \| MDX |
|---|---|---|---|
| MDI | × | ○ | ○ |
| MDX | ○ | × | ○ |
| MDI \| MDX | ○ | ○ | ○ |

| CONNECTOR CONNECTION END CHARACTERISTIC | CABLE OTHER END CHARACTERISTIC | |
|---|---|---|
|  | STRAIGHT | CROSS |
| MDI | MDI | MDI−X |
| MDI−X | MDI−X | MDI |
| MDI \| MDI−X | MDI \| MDI−X | MDI \| MDI−X |

| CHARACTERISTIC CODE | FIXED CHARACTERISTIC | FIXED JUDGING EXPRESSION | VARIABLE CHARACTERISTIC | VARIABLE JUDGING EXPRESSION |
|---|---|---|---|---|
| CAT5C | SH:={RJ45}, MF:={M} | SH@O == SH@S && (MF@O & MF@S) == φ | null | null |
| CAT5T | SH:={RJ45}, MF:={F} | SH@O == SH@S && ... | LANSP := {i|u}, LANPIN := [MDI] | LANSP@O & LANSP@S != φ && LANPIN ... |
| CAT6H | SH:={RJ45}, MF:={F} | SH@O == SH@S && ... | LANSP := {i|u|ab}, LANPIN := [MDX] | LANSP@O & LANSP@S != φ && LANPIN # ... |
| ... | | | ... | |

| FUNCTION CODE | TYPE | CONVERSION TYPE | TRANSFER FUNCTION |
|---|---|---|---|
| CAT5CBSP | CABLE | CHARACTERISTIC VALUE | LANSP:=LANSP@O&{i|u},LANPIN:= ... |
| CAT5CBCP | CABLE | CHARACTERISTIC VALUE | LANSP:=LANSP@O&{i|u},LANPIN:= ... |
| CAT5CNP | CONNECTOR | CHARACTERISTIC VALUE | LANSP:=LANSP@O,LANPIN:=LANPIN@O |
| CAT5CNE | CONNECTOR | JUDGING EXPRESSION | null |
| CAT6CNP | CONNECTOR | CHARACTERISTIC VALUE | LANSP:=LANSP@O,LANPIN:=LANPIN@O |
| CAT6CNE | CONNECTOR | JUDGING EXPRESSION | null |
| ... | ... | ... | ... |

FIG.13

| COMPONENT CODE | NAME | COMPONENT TYPE | ... |
|---|---|---|---|
| CBL1 | CAT-5 STRAIGHT CABLE | CABLE | ... |
| CBL2 | CAT-5 CROSS CABLE | CABLE | ... |
| SVR1 | IA SERVER | SERVER | ... |
| HUB1 | 24 Port Switching HUB | HUB | ... |
| ⋮ | ⋮ | ⋮ | ⋮ |

| CONNECTOR ID | CONNECTOR CODE | COMPONENT CODE | CHARACTERISTIC CODE | ... |
|---|---|---|---|---|
| 1 | LAN1 | CBL1 | CAT5C | ... |
| 2 | LAN2 | CBL1 | CAT5C | ... |
| 3 | LAN1 | SVR1 | CAT5T | ... |
| 4 | P1 | HUB1 | CAT6H | ... |
| 5 | LAN1 | CBL2 | CAT5C | ... |
| 6 | LAN2 | CBL2 | CAT5C | ... |
| ⋮ | ⋮ | ⋮ | ⋮ | ⋮ |

| COMPONENT CODE | FUNCTION CODE | START POINT CONNECTOR ID | END POINT CONNECTOR ID |
|---|---|---|---|
| CBL1 | CAT5CBSP | −1 | −1 |
| CBL2 | CAT5CBCP | −1 | −1 |
| ⋮ | ⋮ | ⋮ | ⋮ |

| CONNECTOR ID | FUNCTION CODE |
|---|---|
| 3 | CAT5CNP |
| 4 | CAT6CNP |
| 3 | CAT5CNE |
| 4 | CAT6CNE |
| ⋮ | ⋮ |

CONNECTION CONSISTENCY CHECK PROCESSING METHOD, CABLE SELECTION PROCESSING METHOD, DESIGN CONFIRMATION PROCESSING DEVICE AND RECORDING MEDIUM THAT RECORDS DESIGN CONFIRMATION PROCESSING PROGRAM

CROSS-REFERENCE TO RELATED APPLICATION(S)

This is a continuing application, filed under 35 U.S.C. §111(a), of International Application PCT/JP2007/051467, filed Jan. 30, 2007.

FIELD

The embodiment discussed herein relates to a connection consistency check processing method, cable selection processing method, design confirmation processing device and recording medium that records a design confirmation processing program in a design system that expresses a design of, for example, a computer system as an electronic drawing, for checking validity of connection from connection lines between components in a design drawing expressed as the electronic drawing, judging whether a cable is necessary for the connection or not and outputting a connectable cable candidate.

BACKGROUND

In a design of, for example, a network system linking many computers via a network, a system structure diagram is created using CAD. Furthermore, attempts are made to check consistency of the system structure diagram created using CAD with a certain degree of automation.

CAD in a conventional printed circuit board design judges whether connections are good or not as a check of connectability between pins based on properties of signals passing through the pins. Such a check of connectability between pins in a CAD design drawing (part of DRC [Design Rule Check]) checks whether connections are good or not by hard-coding the properties of signals passing therethrough (e.g., connections are not possible between output signal pins). That is, it is necessary to code a check program for every individual check target and create a program for checking every characteristic and condition of various signals of the respective pins.

This method works fast but has extreme difficulty in handling the following cases. First, there is a case where connectability between pins whose properties are not clearly defined at the time of creating a library data/processing program is checked, and second, there is a case where a component using a new technique appears and a connectability check is speedily extended using the properties of the technique and so on, and in such cases, a program incorporating logic for a new connectability check needs to be created.

A card design verification method and a card design verification system described in Patent Document 1 (Japanese Patent Laid-Open No. 2004-287585) shown below carry out not only consistency verification of pin attributes of a connector but also verification of electric connections before and after the connector in connection verification between cards. Here, connection verification is also made possible between cards based on information of a network list for every card type and information of connection between the cards. However, when new pin attributes and signal characteristics are introduced just as the conventional printed circuit board design CAD, a program needs to be modified or added so as to enable such introduction to be verified every time.

DISCLOSURE OF THE INVENTION

CAD may be applied to a system design such as a network system, not a design of a printed circuit board. In such a case, a connectability check as in the case of conventional CAD is performed, but the connection unit of the system design CAD is a connector and the connection thereof is a direct connection between connectors or connection via a cable.

Connection in connector units needs to take into consideration limitations in physical properties of signal transfer such as conventional signal attenuation and disturbance due to noise or the like and also take into consideration a method for transferring a logical property of "signal protocol."

Since the "signal protocol" is logical, it is more arbitrary and has a higher degree of freedom and changes more strongly than transfer in physical properties. For this reason, it is not easy to follow changes using a simple check method through hard coding of a program and a connectability check of system design CAD which is dependent on hard coding becomes obsolete very soon.

As described above, the conventional CAD judges whether connections are good or not based on the properties of signals passing through pins as a check of connectability between the pins, but since a connector connection check on a system structure diagram further needs to take into consideration a logical property of signal protocol, the above prior art cannot be simply applied, it is not possible to easily check whether connectors can be connected with each other directly or via a single or a plurality of cables and it is not possible to handle a connector or cable of a new specification or a new signal protocol without modifying or adding a check program.

If there is a means that can deal with a connection consistency check of a system structure diagram using a connector or cable of a new specification or a new signal protocol by only adding text data or simple registered data such as translated binary data for speeding up the text data without modifying or adding the check program, it is possible to easily perform a connection consistency check of the system structure diagram and automatically list available cable candidates for also actual cables used for connections, which is considered to be extremely useful for system developers or system installers and capable of constructing a highly reliable system.

In view of the above problems, the embodiment discussed herein provides a highly scalable technique capable of easily making a connection consistency check on a system structure diagram and automatically selecting available cable candidates for also cables actually used for connections.

In order to solve the above problems, the embodiment discussed herein realizes a connection check/cable selection processing method capable of readily following a new technique by developing an engine that enables characteristics of connectors and cables and a judging expression as to whether their connections are good or not to be described using scripts for a general-purpose connection check, further enables a transfer function showing how their characteristic values and connection judging expressions are transferred from connectors of a component to connectors of a cable or from one end of a cable to the other end to be described in script, describes properties of connectors (group) and cables (group) in script beforehand, registers the properties with a database, analyzes the scripts of the respective connectors and available cables in a system structure diagram to be checked and thereby realizes connection consistency checks and selections of suitable cables.

According to an aspect of the embodiment sets, for every connector, information on shape characteristics (outline specification, distinction between male/female, number of pins, location of notch or the like) and electric characteristics (protocol, communication speed or the like) and judging expression as to whether connections are good or not in scripts whose grammatical specifications are predetermined, that is, text data. Furthermore, the present method sets a transfer function (information on a transfer method concerning electric characteristics for the connected other party) for every cable and connector in scripts whose grammatical specifications are likewise predetermined.

The transfer function expresses cable/connector properties to make it possible to check connectability between connectors via a cable, and when the electric characteristics are thereby transferred and, for example, two RJ-45 female shaped connectors are connected via a cable having RJ-45 male shapes at both ends, the transfer function allows judgments such as judging "OK" for a combination between RS232C connectors or a combination between LAN connectors and excluding a combination between RS232C and LAN connectors.

Using the above script execution engine to analyze script, a script set for every connector or cable is analyzed and it is thereby judged whether their connections are good or not. When the connection judging expression proves connectability in both the shape characteristics and electric characteristics, the connector or cable is judged to be connectable. As for a judgment as to whether connections in the electric characteristics are good or not, a judgment is made as to whether connections are good or not in the electric characteristics transferred by a cable/connector transfer function. When all these judgment results are "OK," the connection via the cable is judged to be possible.

By describing the shape characteristics, electric characteristics, connection judging expression and transfer function in script in this way, it is possible to easily define properties of connectors and cables, easily confirm connection consistency, cover all cable candidates available for connections and present the cable candidates to a system installer or the like.

More specifically, the embodiment discussed herein is a design confirmation processing device for checking whether components linked by lines in a system structure diagram are actually connectable with each other or not based on electronic information of the system structure diagram. The device includes a characteristic/judging expression script storage unit that stores, for a connector used to connect components, definition information describing in script according to a predetermined grammatical rule, fixed characteristics showing shape and state characteristics, a connection judging expression of the fixed characteristics to judge whether the fixed characteristics are connectable values or not, variable characteristics showing electric characteristics and a connection judging expression of the variable characteristics to judge whether the variable characteristics are connectable values or not a transfer function script storage unit that stores, for connectors and cables, definition information describing in script according to a predetermined grammatical rule, a transfer function that shows how to transfer the variable characteristics and the connection judging expression of the variable characteristics between connectors to be connected or between one end and the other end of a cable, wherein a connector group of components to be connected linked by lines on the system structure diagram is extracted from the inputted electronic information of the system structure diagram, scripts describing fixed characteristics, a connection judging expression of the fixed characteristics, variable characteristics and a connection judging expression of the variable characteristics are read for the respective extracted connectors to be connected from the characteristic/judging expression script storage unit, values of the fixed characteristics of the connectors to be connected are evaluated for each cable registered beforehand according to the connection judging expression of the fixed characteristics to judge whether their connections are good or not, the variable characteristics and the connection judging expression of the variable characteristics of the connection source are deformed according to the transfer function, transferred to the transfer target, which is the connected other party, processing of evaluating the variable characteristics according to the connection judging expression of the variable characteristics and judging whether their connections are good or not is repeated for each connected portion to thereby certify that there is connection consistency when there exists a cable judged to be connectable in all the processing and certify that there is no connection consistency when there exists no cable judged to be connectable in all the processing, and information as to whether there is connection consistency or not is outputted.

Alternatively, the design confirmation processing device of the present invention is provided with a processing unit that outputs cable candidates certified to have connection consistency by the design confirmation processing device. Furthermore, the design confirmation processing device may also include a unit that checks whether a connector of a component to be connected extracted from the electronic information of the system structure diagram is directly connectable without using any cable or not by analyzing scripts describing the fixed characteristics, connection judging expression of the fixed characteristics, variable characteristics and a connection judging expression of the variable characteristics of the connector and outputs information indicating that the connector is directly connectable when both judging results of the connection judging expression of the fixed characteristics and the connection judging expression of the variable characteristics are "true."

The object and advantage of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 12 shows a configuration example of a characteristic/judging expression master table;

FIG. 13 shows a configuration example of a transfer function master table;

FIG. 14 shows a configuration example of a component master table;

FIG. 15 shows a configuration example of a component connector table;

FIG. 16 shows a configuration example of a cable transfer function correspondence table;

FIG. 17 shows a configuration example of a connector transfer function correspondence table;

DESCRIPTION OF EMBODIMENT

Figure 1:
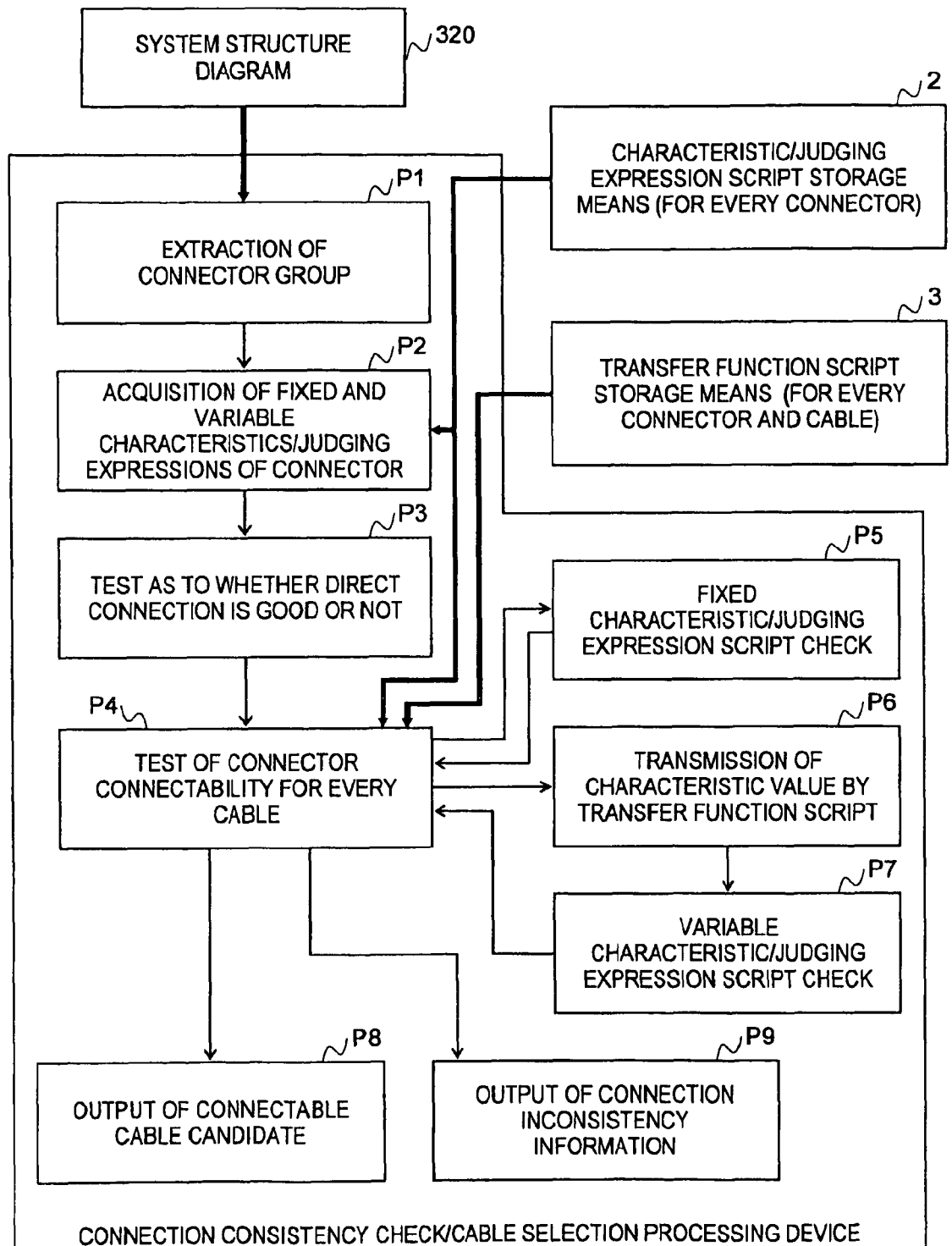
FIG. 1 illustrates an overview of the present invention.

FIG. 1 illustrates an overview of the embodiment discussed herein. In FIG. 1, reference numeral 1 denotes a connection consistency check/cable selection processing device, 2 denotes a characteristic/judging expression script storage unit, 3 denotes a transfer function script storage unit and 320 denotes a system structure diagram converted into electronic information form. The present embodiment explains a system structure diagram created using a CAD system as an example, but the present invention is not limited to this and may also be applicable to electronic information created using any means other than a CAD system if it is at least system structure diagram data including similar information.

In the system structure diagram 320, interfaces of components making up the system such as a server and network apparatus are linked by lines and their connection relationships are defined. When the system is actually mounted, suitable cables corresponding to the interfaces between the components should be assigned or the interfaces (connectors) should be directly connected with each other. The server and various types of network apparatus are provided with connectors and cables are also provided with connectors for connections.

In order for connectors to be connectable with each other, the respective connectors must be compatible with each other in shape characteristics such as outline specification, distinction between male/female, number of pins and notch positions. They must also be compatible with each other in electric characteristics such as signal protocol and communication speed or the like. Furthermore, when the components are connected with each other using a cable, the electric characteristics of the connector of one component are transferred to the connector of the component of the connected other party. Therefore, the connector of the component of the connected other party must be compatible with the connector of the cable in the shape characteristics of the respective connectors as well as the transferred electric characteristics. Thus, a test as to whether the shape characteristics and electric characteristics are compatible or not is referred to as a "connection consistency check" here.

Attempting to make a connection consistency check based on the conventional idea of connection verification of a printed circuit board or the like requires a program to be created to check consistency about shape characteristics of the respective connectors such as outline specification, distinction between male/female, number of pins and notch positions and also requires a check program to be created according to the type of electric characteristics to check the electric characteristics. Furthermore, attributes related to many shape characteristics and many electric characteristics to be referred to by these check programs need also to be defined for the respective connectors. Therefore, especially when components with connectors having new shape characteristics and electric characteristics appear, a definition of the attribute information and a program of the connection consistency check need to be newly created, which results in a problem of lack of scalability.

The present invention solves these problems using a script having a predetermined grammatical rule (specification).

Hereinafter, the above shape characteristics will be referred to as "fixed characteristics" and the above electric characteristics will be referred to as "variable characteristics." These characteristics are defined in script describing a set of characteristic values made up of a combination of characteristic names and characteristic values for every connector or connector group having an identical attribute.

Furthermore, a connection judging expression used for judging whether connections with the connected other party are good or not is defined in script for the fixed characteristics and variable characteristics respectively. The script of the judging expression can describe truth/falsehood of a result of carrying out mathematical operation/logical operation/set operation on variables identified by the characteristic name and distinction between the own and other party connectors. When connectors are connected with each other, a characteristic value set of the own and other party connectors is given to the connection judging expression of fixed characteristics (hereinafter, abbreviated as "fixed judging expression") of each connector and connection judging expression of variable characteristics (hereinafter, abbreviated as "variable judging expression") as a value, connection consistency of the fixed judging expression and variable judging expression is judged respectively and the connector is determined to be "connectable" when the results of all judging expressions are "true."

As for the variable characteristics, "null" is permitted as the original characteristic value and in the case of "null," the variable characteristics of the other connector that has contact can be deformed and assigned via a connector transfer function.

Furthermore, assuming a cable as an attribute (fixed characteristic/variable characteristic) of a connector at an endpoint and a line segment portion linking the connector, the original value of the variable characteristics of the connector portion is regarded as "null" and a cable transfer function is defined for the line segment portion so that the variable characteristics deformed by the function become variable characteristics of the connector at the other end. In this case, when there are three or more connectors making up a cable, such a mechanism is provided that can define the defined transfer function as deformation from which endpoint to which endpoint. When one end of the cable is connected to the connector, a mechanism is provided whereby the variable characteristics of the cable are defined as deformation of the variable characteristics of the connector via a connector transfer function and the variable characteristics at one end are transferred to the other end via the cable transfer function. When the other end of the cable comes into contact with the connector, a consistency check is made using a transferred value for the variable attribute of the cable side connector.

A script engine is provided which sequentially selects cables from a plurality of defined cable groups for a given connector group, judges consistency and thereby extracts a single or a plurality of connectable cables.

Scripts describing the above fixed characteristics, fixed judging expression, variable characteristics and variable judging expression are registered with and stored in the characteristic/judging expression script storage unit 2 for every connector of a component such as cable and server beforehand. These scripts may be registered for every connector group having the same attribute instead of every connector.

Furthermore, scripts describing an expression for deforming the variable characteristics for transferring the variable characteristics to the connected other party or the other end of the cable are registered with and stored in the transfer function script storage unit 3 for every connector and cable beforehand. These scripts may also be registered for every connector group and every cable group having the same attribute instead of every connector or every cable.

The connection consistency check/cable selection processing device 1 is a script execution engine that receives the system structure diagram 320 converted into electronic information form as input, carries out a connection consistency check on each component of the system structure diagram 320 with reference to the scripts of the characteristic/judging expression script storage unit 2 and the transfer function script storage unit 3, selects and outputs suitable mountable cable candidates.

The connection consistency check/cable selection processing device 1 performs the process as follows. First, processing P1 of extraction of a connector group extracts a connector group of components connected by line segments from the system structure diagram 320 while maintaining the connection relationship. Next, processing P2 of acquisition of fixed and variable characteristics/judging expression of the connector reads scripts describing the fixed characteristics, fixed judging expression, variable characteristics and variable judging expression from the characteristic/judging expression script storage unit 2 for the respective connectors to be connected acquired in the process P1.

Next, processing P3 of a test as to whether direct connection is good or not evaluates the read fixed characteristics and variable characteristics using a fixed judging expression and a variable judging expression respectively and tests as to whether connectors to be connected linked by lines can be directly connected or not without using any cable. When the connectors can be directly connected, information indicating that the connectors can be directly connected without using any cable is outputted assuming, for example, the connectable cable as a dummy cable. Here, the dummy cable is also outputted as one of connectable cable candidates for convenience of processing.

Next, processing P4 of a test of connector connectability for every cable sequentially selects cables to be tested from each cable group registered with a component master table beforehand, and first, processing P5 of a fixed characteristic/judging expression script check checks whether the connector of the component to be connected is compatible with the connector of the cable to be tested in shape and state characteristics or not using the fixed characteristics and fixed judging expression. When the connectors are not compatible with each other in the characteristics, the cable is regarded as being not connectable.

Next, processing P6 of transmission of a characteristic value by a transfer function script transfers a characteristic value of the variable characteristics from the connector of the component to the connector of the cable using a transfer function script to check whether a cable that is compatible in shape and state characteristics is also compatible in electric characteristics or not. Next, processing P7 of a variable characteristic/judging expression script check checks whether the transmitted variable characteristics are connectable or not using a variable judging expression. When the transmitted variable characteristics are connectable, the process P6 of transmission of a characteristic value by a transfer function script further transfers a characteristic value of the variable characteristics from one end of the cable to the connector at the other end of the cable using the transfer function script of the cable, and with regard to the transferred variable characteristics, the process P7 of a variable characteristic/judging expression script check then checks whether the connector of the component of the connected other party is connectable with the connector of the cable or not using a variable judging expression. Likewise, compatibility in shape and state characteristics between the connector of the component of the connected other party and the connector of the cable is also checked through the process P5 of a fixed characteristic/judging expression script check.

When judgment results proving connectability are obtained in all the above checks, the cable is stored as a connectable cable candidate and the next cable is checked for connection consistency.

When the process of a connector connectability test on all cables is completed, a list of cables stored as connectable cable candidates is outputted through the process P8 of output of connectable cable candidate. When none of connectable cable candidates exists, the fact that the component in the system structure diagram 320 is not connectable is outputted through processing P9 of output of connection inconsistency information.

Through the above processing, it is possible to check whether connectors of a plurality of given components are directly connectable or not. Furthermore, it is also possible to check whether connectors of a plurality of given components are connectable via cables or not. Furthermore, candidates of connectable cable group can be outputted to a plurality of given connectors.

Furthermore, it is also possible to add processing of automatically select one cable from among candidates of a connectable cable group. As the method of selecting one cable from among candidates of the connectable cable group, a method of selecting an optimum one under preset selection conditions is used and programming this is easy.

For example, the following selection conditions can be considered, but what selection conditions should be set to narrow down cable candidates to one candidate may be determined arbitrarily beforehand or determined by interactively inquiring of the user.

Examples of Selection Conditions:
(1) Low-cost products are selected preferentially;
(2) Products in stock or products easily available are selected preferentially;
(3) Highly reliable products whose quality can be guaranteed to a certain degree are selected preferentially;
(4) Products whose cable length is suitable for mounting are selected; and
(5) Others, The discussed embodiment can realize the above conditions because the present invention defines shape and state characteristics of each connector, enables properties of the connector for judging connection compatibility thereof to be defined in script as fixed characteristics and fixed judging expression, enables variable characteristics that define electric characteristics such as a signal protocol and a variable judging expression that can check connection compatibility thereof to be defined in script and further enables a transfer function that transfers the variable characteristics and variable judging expression between two different connectors via a cable to be defined in script.

By acquiring scripts of connectors of a component extracted from the system structure diagram 320 and evaluating their fixed characteristics and variable characteristics using a fixed judging expression and variable judging expression respectively, it is possible to determine whether a variety of connectors and cables are connectable or not using the same algorithm for all of them. Also when a new connector or cable becomes available, it is possible to process a program for realizing the connection consistency check/cable selection processing device 1 (script execution engine) shown in FIG. 1 in a single uniform way without altering the program by defining their characteristics or the like in simple script.

Hereinafter, an embodiment of the present invention will be explained with reference to the accompanying drawings.

Figure 2:
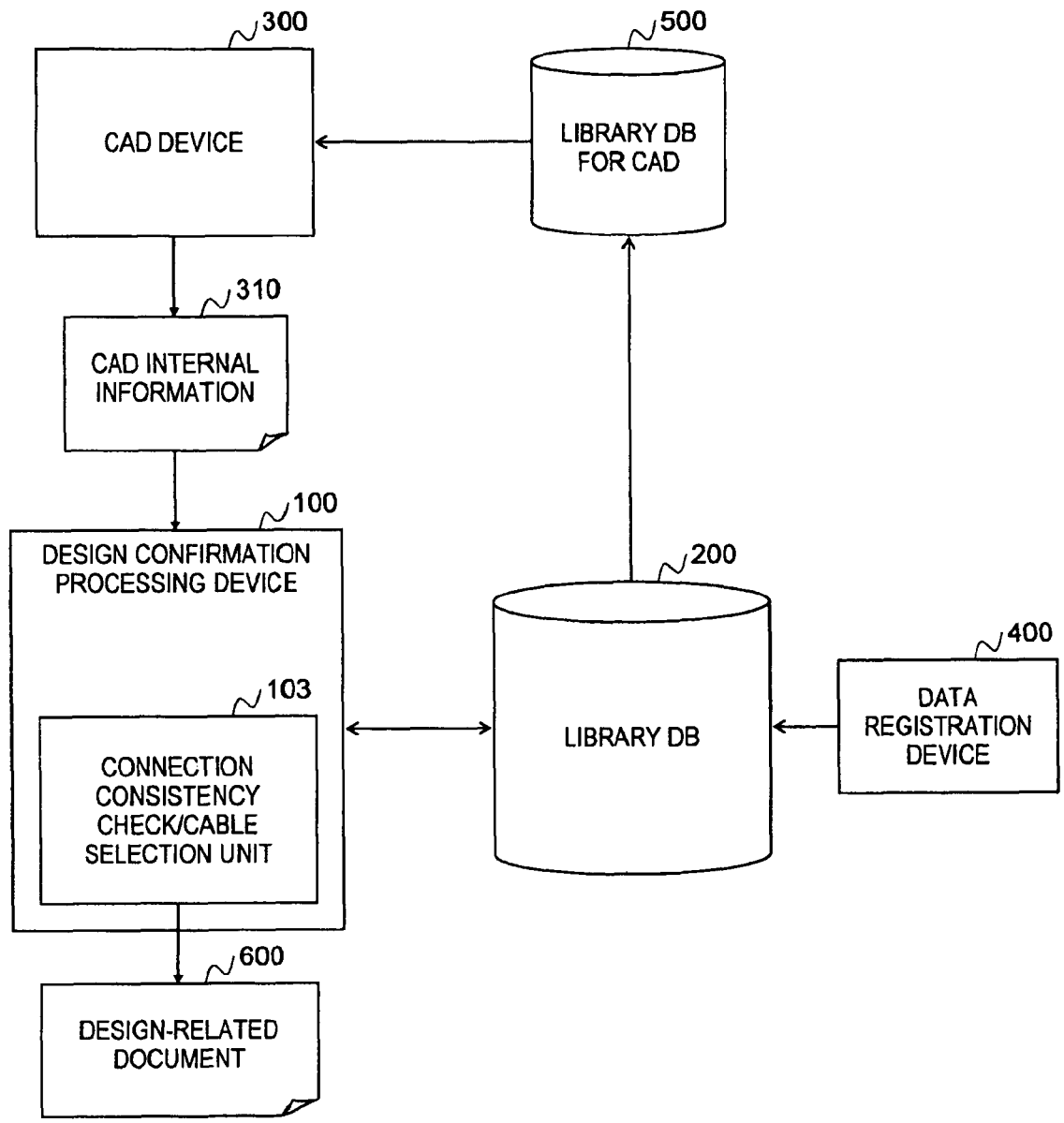
FIG. 2 illustrates an overall image of a system design according to an embodiment of the present invention.

FIG. 2 illustrates an overall image of a system design according to an embodiment of the present invention. The system design according to the present embodiment is mainly realized by a design confirmation processing device 100, a library DB 200 and a CAD device 300.

The designer carries out a system design using the CAD device 300. The design confirmation processing device 100 creates a design-related document 600 from CAD internal information 310 of the system structure diagram designed by the CAD device 300. The library DB 200 stores all data necessary for the CAD device 300 and design confirmation processing device 100.

When carrying out a system design, information necessary for the library DB 200 is inputted using a data registration device 400 first. Examples of the information inputted include data such as the model name and name of a product/component, size and power consumption, bitmap data for drawing and information on interfaces of the respective components and their functions.

Next, information necessary for drawing is extracted from the library DB 200 and a CAD library DB 500 is created. The CAD device 300 operates by incorporating the CAD library DB 500. The designer draws a system structure diagram using the CAD device 300.

Next, the CAD device 300 delivers the CAD internal information 310 of the designed system structure diagram to the design confirmation processing device 100 via, for example, a file. The CAD internal information 310 in this case includes, for example, a list of components and interfaces including information on unique internal IDs, DB access codes, model names, list of connections between the interfaces, and property information such as IP addresses set by the designer in the components and interfaces and SCSI information.

The design confirmation processing device 100 analyzes the CAD internal information 310 delivered from the CAD device 300, compensates for lacking information by accessing the library DB 200, applies other necessary processing and generates the design-related document 600. Examples of the lacking information include a connection judgment script, net exploration codes for pursuing a connection relationship on the design drawing, protocol information, fixed properties which are unnecessary for the design by the CAD device 300 and interface names that vary from one type to another of output information.

The discussed embodiment mainly relates to a connection consistency check/cable selection unit 103 of the design confirmation processing device 100 that extracts available cable candidates.

Figure 3:
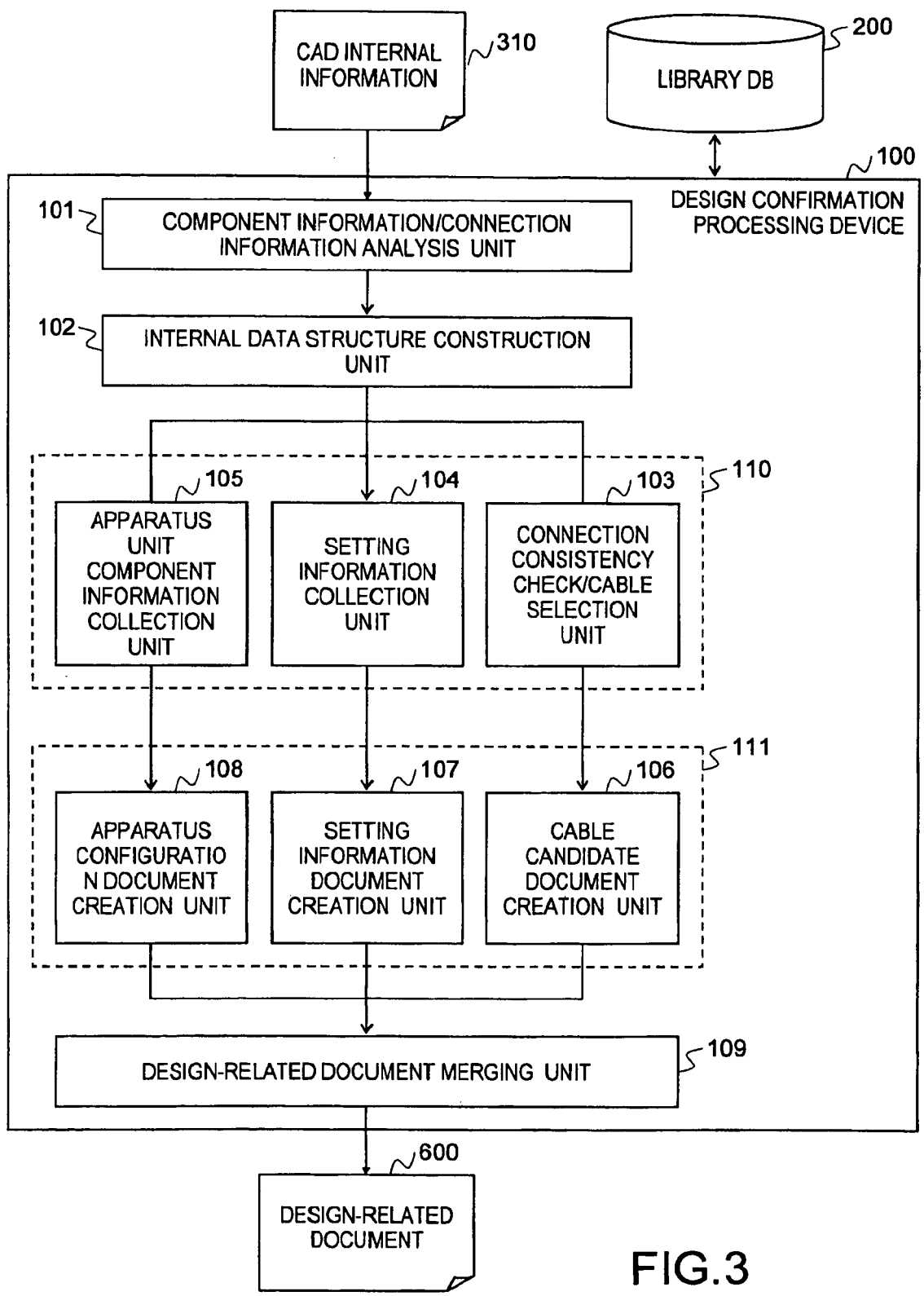
FIG. 3 shows a configuration example of a design confirmation processing device.

FIG. 3 shows a configuration example of the design confirmation processing device. The design confirmation processing device 100 looks up the library DB 200 and generates the design-related document 600 from the CAD internal information 310 of the system structure diagram created by the CAD device 300. The design confirmation processing device 100 is provided with a component information/connection information analysis unit 101, an internal data structure construction unit 102, a connection consistency check/cable selection unit 103, a setting information collection unit 104, an apparatus unit component information collection unit 105, a cable candidate document creation unit 106, a setting information document creation unit 107, an apparatus configuration document creation unit 108 and a design-related document merging unit 109.

Hereinafter, the portion including the connection consistency check/cable selection unit 103, setting information collection unit 104 and apparatus unit component information collection unit 105 will be referred to as a "preliminary portion of processing for creating various documents 110". On the other hand, the portion including the cable candidate document creation unit 106, setting information document creation unit 107 and apparatus configuration document creation unit 108 will be referred to as a "subsequent portion of processing for creating various documents 111".

The design confirmation processing device 100 receives the CAD internal information 310 of the system structure diagram from the CAD device 300. The CAD internal information 310 received is sent to the component information/connection information analysis unit 101 first.

The CAD internal information 310 includes not only the information of the components used in the system structure diagram and connection information but also information irrelevant to the generation of the design-related document 600 such as position information of the components on the system structure diagram. The CAD internal information 310 is outputted from the CAD device 300 as, for example, a CSV format file. The component information/connection information analysis unit 101 performs processing of analyzing the format (CSV) first and then extracting only information on the components and connections. The information extracted by the component information/connection information analysis unit 101 is sent to the internal data structure construction unit 102.

The internal data structure construction unit 102 converts identifiers of the components and connections sent from the CAD device 300 and their connection relationship to objects so as to be easily handled in subsequent processing and acquires lacking common information from the library DB 200. The "lacking common information" refers to, for example, information of "LAN interface with no lines connected because the use thereof is not set on the system structure diagram." The internal data object constructed by the internal data structure construction unit 102 is sent to the respective processing sections of the preliminary portion of processing for creating various documents 110, that is, the connection consistency check/cable selection unit 103, setting information collection unit 104 and apparatus unit component information collection unit 105.

The preliminary portion of processing for creating various documents 110 performs processing of collecting information and processing of selecting information with reference to necessary components of the internal data objects and connection relationship according to the respective purposes.

The connection consistency check/cable selection unit 103 extracts the interface information at both ends of the connection relationship, judges whether those interfaces are directly connectable with each other or not or connectable with each other via a cable or not, stores only connectable ones, and thereby selects a cable. The cable selection also includes a direct connection without any cable. In this case, the acquisition of a script expressing properties of the interfaces and properties of the cables is solved with reference to the library DB 200.

While tracing the connection relationship from a certain component, the setting information collection unit 104 collects paths of the connection relationship and collects property information set in the respective component objects. In this case, the way the connection relationship is traced may vary depending on the purpose of collection of the setting information. Here, the information instructing the way the connection relationship is traced according to the purpose of collection of the setting information is registered with the library DB 200 beforehand and way the connection relationship is traced according to the purpose of collection of the setting information can be acquired with reference to the library DB 200.

The apparatus unit component information collection unit 105 divides the connection relationship between components into intra-apparatus connections and inter-apparatus connections, ignores inter-apparatus connections and follows only intra-apparatus connections and thereby collects configuration information in apparatus units. In this case, information to make a distinction between inter-apparatus connections and intra-apparatus connections or the like is acquired from the library DB 200.

Since the information collected by the preliminary portion of processing for creating various documents 110 is information in an internal format, the information needs to be converted to a human-readable format. Therefore, subsequent portion of processing for creating various documents 111 corresponding to the preliminary portion of processing for creating various documents 110, that is, the processing sections such as the cable candidate document creation unit 106, setting information document creation unit 107 and apparatus configuration document creation unit 108 are provided. The preliminary portion of processing for creating various documents 110 sends the collected information to the corresponding sections of the subsequent portion of processing for creating various documents 111.

The subsequent portion of processing for creating various documents 111 mainly performs formatting for outputting various kinds of collection information and a conversion from information in an internal format to information in a human-readable format. The "information in a human-readable format" refers to, for example, identification information of a component which is a simple symbol in the internal format converted to a name assigned to the component. The subsequent portion of processing for creating various documents 111 looks up the library DB 200 to perform such a conversion.

The cable candidate document creation unit 106 creates a cable candidate document based on information of cables collected by the connection consistency check/cable selection unit 103 and the cable selection result. The setting information document creation unit 107 creates a setting information document from the setting information collected by the setting information collection unit 104. The apparatus configuration document creation unit 108 creates an apparatus configuration document from the configuration information in apparatus units collected by the apparatus unit component information collection unit 105.

Thus, providing the preliminary portion of processing for creating various documents 110 and the corresponding subsequent portion of processing for creating various documents 111 for every purpose allows various documents corresponding to various purposes to be created.

The subsequent portion of processing for creating various documents 111 outputs information of various documents according to the respective purposes. The design-related document merging unit 109 chooses the information of various documents outputted from the subsequent portion of processing for creating various documents 111 according to the purposes of the respective users and creates the design-related document 600 according to the purposes of the respective users.

For example, since a CE (customer engineer) who performs system construction related operations needs mainly hardware-related information such as intra-apparatus connection information and inter-apparatus connection information, apparatus configuration documents created by the apparatus unit component information collection unit 105, apparatus configuration document creation unit 108 and cable candidate documents created by the connection consistency check/cable selection unit 103 and cable candidate document creation unit 106 or the like are required.

Furthermore, since among people who perform system construction related operations likewise, an SE (system engineer) mainly needs software-related information, setting information documents created by the setting information collection unit 104 and setting information document creation unit 107 are indispensable and other documents are required only for reference purposes.

Furthermore, the information created by the connection consistency check/cable selection unit 103 and cable candidate document creation unit 106 is indispensable to people involved in design who need to narrow down cable candidates.

The subsequent portion of processing for creating various documents 111 can also create document information in a machine-readable format such as XML format to link up with other systems. This makes it possible, for example, to send information of a cable candidate document created by the cable candidate document creation unit 106 together with the apparatus information and connection information of the system structure diagram to a mounting solution device that carries out a mounting design on a rack and allow the mounting solution device to select a cable of an optimum length from among the narrowed-down cable candidates based on the information of the cable candidate document.

Therefore, in the subsequent portion of processing for creating various documents 111, a plurality of processing sections may be arranged for one processing section of the preliminary portion of processing for creating various documents 110.

In such a system design environment, the present invention particularly relates to data registered with the connection consistency check/cable selection unit 103 and library DB 200.

Before explaining the cable selection processing according to the present embodiment, the present invention will explain a definition (specification) example of a script language describing fixed and variable characteristics, their connection judging expressions and transfer functions, and then will explain definition/operation examples of script such as variable characteristics necessary for the cable selection processing according to the present embodiment.

<Example of Definition of Script Language>

An actual script language may define the method of handling a numerical range and may have much more or fewer operators than operators in the following example. Here, a definition example of a typical script language used in the present embodiment will be explained, but the example explained below is sufficient to understand the present invention and the definition may be arbitrarily changed or added as design items.

[Characteristic Set]

A characteristic set is a set of a plurality of characteristics and respective characteristics will be described delimited by ";" as follows.

Characteristic 1, characteristic 2, characteristic 3, . . . .

Characteristic:

For a characteristic, a characteristic name and a characteristic value are described delimited by ":=" as follows.

Characteristic name:=characteristic value set

Characteristic Name:

A characteristic name is handled as "variable," starts with an alphabetic character and an arbitrary number of alphabetic characters, numbers and "_" can be connected. That is, a characteristic name may be expressed in a format [A-Za-z][A-Za-z0-9_]*.

Characteristic Value Set:

A characteristic value set is a set of characteristic values enumerated as set elements. The following description expresses that this characteristic value set has characteristic value 1, characteristic value 2, characteristic value 3, . . . characteristic value N.

{Characteristic value 1|characteristic value 2|characteristic value 3| . . . |characteristic value N}

When the characteristic value set is an empty set, the set may be described as "φ." In the case of only ASCII, the set may be described as, for example, {*PHI*}.

Characteristic Value:

A characteristic value may be freely defined as an easy to understand character string expressing each characteristic (property). However, no number is acceptable for the first character. The characteristic value is basically handled as a "character string" and has consistency judged in a normal program description language, that is, has a property that characteristic values having the same character string are equal. For example, "IE802.3a", "a", "MDI" are characteristic value character strings.

Example of Characteristic Set:

LANSP:={i|u}, LANPIN:={MDI}

Meaning: The characteristic expressed by a characteristic name "LANSP" has two character string elements of "i" and "u" and the characteristic expressed by a characteristic name "LANPIN" has a character string element of "MDI" and is interpreted to have these two characteristics together.

[Variable]

A variable generally has a format of "characteristic name" but when the variable is used in an expression (EXPR, LEXPR in the explanation of operator, which will be described later) and the same characteristic name between different connectors is handled, a suffix is added which indicates the connector whose characteristic name is expressed.

@S: Suffix indicating characteristic name of self connector

@O: Suffix indicating other connector, that is, characteristic name of connector of other party. @O expresses a characteristic name of the source of a transfer function.

EXAMPLE 1

LANSP@S & LANSP@O!=φ

This example 1 is a definition example of a connection judging expression that calculates the product of the LAN speed property (LANSP@S) of the connector on the self side and the LAN speed property (LANSP@O) of the connector on the other party side and judges whether the result is an empty set or not.

EXAMPLE 2

LANSP:=LANSP@O & {i|u}

This example 2 is a definition example of a transfer function where the product of a LAN speed property of a certain connector and a characteristic value set of {i|u} is assumed to be a LAN speed property of a connector at the other end.

[Operator]

EXPR1 & EXPR2 (Binary Operator)

The product of both set elements of EXPR1 and EXPR2, that is, a common element is obtained. An arithmetic expression including a variable (characteristic name) and characteristic value set can be described in EXPR1 and EXPR2.

Example: {A|B|C|D} & {B|D|E|F}→{B|D}

EXPR1 # EXPR2 (Binary Operator)

An exclusive-OR of elements of both sets EXPR1 and EXPR2 is calculated.

Example: {A|B|C|D} #{B{D|E|F}→{A|C|E|F}

EXPR1 Except EXPR2 (Binary Operator)

This obtains the set element of EXPR1 from which the element included in EXPR2 is excluded.

Example: {A|B|C|D} except {B|D|E|F}→{A|C}

PROP:=EXPR1 (Assignment Operator)

EXPR1 is assigned to PROP. A "characteristic name" can be described in PROP. The operation result in this case is EXPR1.

Example: LANSP:={i|u|ab} & {i|u}

The operation result ({i|u}) is assigned to LANSP and this assignment expression itself returns the operation result ({i|u}).

EXPR1==EXPR2 (Comparison Operator)

"True" results when EXPR1 is equal to EXPR2 and "false" results otherwise. "Equal" means that the numbers of the respective set elements are equal and there exist equal elements corresponding to the respective elements, that is, elements of the same character string, and the description order does not matter.

Example:

| | | |
|---|---|---|
| {A|B|C} == | {A|B|C} | → true |
| {A|B|C} == | {A|C|B} | → true |
| {A|B} == | {A|B|C} | → false |
| {A|B|C} == | {A|B|D} | → false |
| {A|B|C} == | φ | → false |
| φ == | φ | → true |

EXPR1!=EXPR2(comparison operator)

"False" results when EXPR1 is equal to EXPR2 and "true" results otherwise.

Example:

| | | |
|---|---|---|
| {A|B|C} != | {A|B|C} | → false |
| {A|B|C} != | {A|C|B} | → false |
| {A|B} != | {A|B|C} | → true |
| {A|B|C} != | {A|B|D} | → true |
| {A|B|C} != | φ | → true |
| φ != | φ | → false |

LEXPR1 && LEXPR2 (logical operator)

LEXPR1 and LEXPR2 are ANDed. "True" results only when both LEXPR1 and LEXPR2 are "true" and "false" results otherwise. LEXPR indicates a logical expression expressing true/false.

LEXPR1||LEXPR2 (Logical Operator)

LEXPR1 and LEXPR2 are ORed. "True" results when either LEXPR1 or LEXPR2 is "true" and "false" results only when both are "false." LEXPR1 and LEXPR2 can take a logical value (true/false) itself or a logical expression (expression whose result is a logical value and which is an expression combined by a logical operator or comparison operator).

LEXPR ? EXPR1: EXPR2 (Ternary Operator)

EXPR1 is returned when LEXPR is "true" and EXPR2 is returned when LEXPR is "false."

[Connection Judging Expression]

A connection judging expression refers to an expression whose result of combining the above characteristic value set (note that the connection judging expression is not a characteristic set) and operators expresses "true" or "false."

[Transfer Function Set]

A transfer function set expresses a plurality of transfer functions enumerated and delimited by ",".

Transfer function 1, transfer function 2, . . . .

Transfer Function:

A transfer function has a form of assignment expression and assumes that an assignment result has been transferred to a connector at the other end.

<Definition Example of LAN>

A definition/operation example of script of variable characteristics or the like necessary for cable selection processing (including connection consistency check) defined according to the specification of the above script language will be explained.

[IEEE802.3-Based Protocol]

An IEEE802.3 system includes, for example, the following definition about the LAN speed.

| | | |
|---|---|---|
| 802.3i : 10Base-T | 10 | Mbps |
| 802.3u : 100Base-Tx | 100 | Mbps |
| 802.3ab: 1000Base-T | 1 | Gbps |

Which of these protocols should be supported varies depending on the apparatus (connector)/cable and finally becomes operable when apparatuses at both ends of the cable support a common protocol. Attention is focused on the speed in this case.

The following explanation assumes that the characteristic name about the transmission rate is LANSP, a difference in the specification name is used as the characteristic value: "i" is used for 802.3i, "u" for 802.3u and "ab" for 802.3ab.

(1) Definition of Rate Characteristic on Connector Side (Example)

There are various specifications that can be handled by an apparatus. Some of their typical examples will be shown below.

| | |
|---|---|
| LANSP := {i} | : 10 Mbps dedicated apparatus |
| LANSP := {i \| u} | : 10/100 Mbps apparatus |
| LANSP := {i \| u \| ab} | : 10/100/1000 Mbps apparatus |
| LANSP := {ab} | : 1 Gps dedicated apparatus |

(2) Connectability Between Connectors (2-1) Connection Matrix

Figures 4, 5:
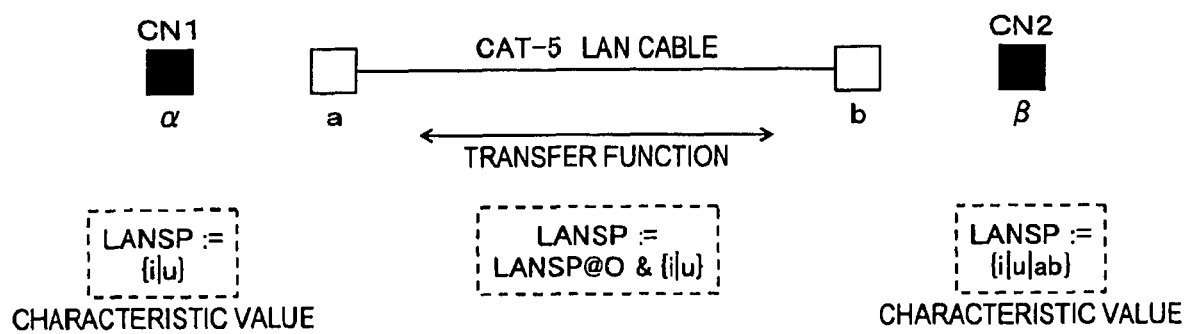
FIG. 4 shows a connection matrix.
FIG. 5 illustrates an operation example of script.

FIG. 4 shows a connection matrix. Among connectors of different specifications, those of a common specification are connectable with each other. FIG. 4 shows a matrix expressing connectable relationships.

(2-2) Connection Judging Expression (Script)

From the connection matrix shown in FIG. 4, a judging expression may be created which shows that a condition for ANDing between the value of the self connector and the value of the other connector is not empty. Furthermore, the judging expression is directly applicable to a case where one connector supports a plurality of specifications as shown in the example of (1), too. That is,

LANSP@S & LANSP@O!=φ

Since this can be used for any connector, the transfer function in the judging expression may be an identity function.

(3) Transfer Function of Cable

A frequency characteristic of a cable is determined by a method of shielding a connector or a cable portion or a method of stranding a strand in a cable or the like and the speed of the applicable protocol is thereby restricted. This restriction is normally expressed as a category (CAT), and there are CAT-3, CAT-5, CAT-5e and CAT-6 or the like. The respective cables are expressed as follows.

CAT-3:

CAT-3 can only handle a signal at a rate of 10 Mbps. Irrespective of the type of the connector on the apparatus side to which the cable is connected, only 802.3i appears as the specification name on the other end side. Nothing appears in a connector that does not support 802.3i.

LANSP:=LANSP@O & {i}

CAT-5:

CAT-5 can handle signals at rates of 10 Mbps and 100 Mbps. Considering just as CAT-3, LANSP:=LANSP@O & {i|u}

CAT-5e, CAT-6:

CAT-5e and CAT-6 can handle rates of 10 Mbps, 100 Mbps and 1 Gbps. CAT-5e and CAT-6 are different from a comprehensive standpoint, but can be handled equally in terms of rates. Therefore, considering just as CAT-3 and CAT-5, LANSP:=LANSP@O & {i|u|ab}

(4) Script Operation Example

FIG. 5 illustrates an operation example of script. An example of script operation where a connector CN1(α) of 10/100 Mbps and connector CN2(β) of 10/100/1000 Mbps are connected using a LAN cable of CAT-5 will be explained using FIG. 5 below.

(4-1) Connection of Connector CN1(β) and Connector a of LAN Cable

Since the variable characteristic of the connector a of the LAN cable is "null," no connection judging expression is used and characteristics are transferred from the connector CN1(α) to the connector a of the LAN cable using a connector transfer function of identity function.

| |
|---|
| α: LANSP := {i \| u} → LANSP := {i \| u} |
| a: LANSP := null → LANSP := {i \| u} |

(4-2) Characteristics of the Connector a of the LAN Cable are Transferred to the Connector b Using a Cable Transfer Function.

Since "@O" denotes "characteristics at the connector a of the LAN cable" from the viewpoint of the connector b of the LAN cable, characteristics are transferred to the connector b of the LAN cable through the transfer function as follows.

| |
|---|
| LANSP := LANSP@O & {i \| u} |
| := {i \| u} & {i \| u} |
| := {i \| u} |

(4-3) Connection of Connector CN2(β) and Connector b of LAN Cable

Since characteristics are transferred to the connector b of the LAN cable through the cable transfer function and the characteristics are not "null," the connector transfer function of the connector CN2(β) is not used here and connectability is judged using the connection judging expression of the connector b of the LAN cable and the connector CN2(β).

Figure 6A:
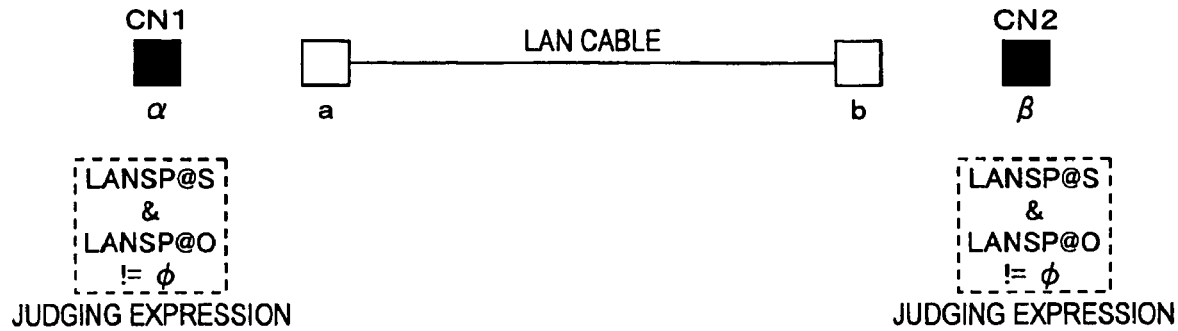
FIGS. 6A and 6B show a connection judging expression of each connector.
Figure 6B:
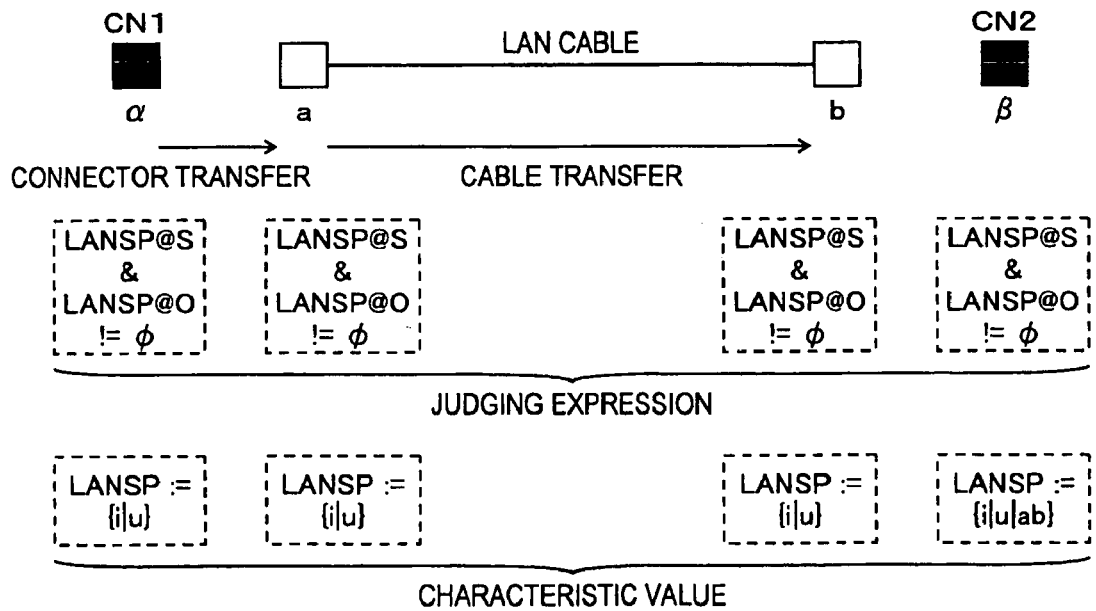

FIG. 6 shows connection judging expressions of the respective connectors. FIG. 6A shows an initial condition and FIG. 6B shows a condition after characteristics are transferred from the connector a to the connector b of the LAN cable. Although the descriptions of the connection judging expressions have been omitted so far, the judging expressions from (2-2) onward are as shown in FIG. 6A and FIG. 6B. FIG. 6B also shows the characteristic values calculated so far.

(4-4) Connection Judgment at Connector CN2(β)

LANSP@S:={i|u|ab}, LANSP@O:={i|u} are used as characteristic values.

$$\text{LANSP@S \& LANSP@O} := \{i\,|\,u\,|\,ab\} \,\&\, \{i\,|\,u\}$$
$$:= \{i\,|\,u\} \quad [\,!=\phi\,]$$

Since the result is not an empty set, the judgment becomes "OK."

(4-5) Connection Judgment at Connector b of LAN Cable

LANSP@S:={i|u}, LANSP@O:={i|u|ab} are used as characteristic values.

$$\text{LANSP@S \& LANSP@O} := \{i\,|\,u\} \,\&\, \{i\,|\,u\,|\,ab\}$$
$$:= \{i\,|\,u\} \,[\quad !=\phi\,]$$

Since the result is not an empty set, the judgment becomes "OK."

Since both judging expressions become "OK," connectability at this connection point becomes "OK." Therefore, it has been proven that the connector CN1 and connector CN2 can be connected using the LAN cable of CAT-5.

Here, a case where the connector CN1 remains 10/100 Mbps and the connector CN2 is a 1 Gbps dedicated connector will be considered. The judgment up to (4-2) is the same as that in the above example, but the judgment of (4-3) on the CN2(β) side is, $$\text{LANSP@S \& LANSP@O} := \{ab\} \,\&\, \{i\,|\,u\}$$
$$:= \phi \quad [\,==\phi\,]$$

the connectability (φ!=φ) becomes "NG" (judging expression is false). Therefore, it is judged that the connector CN1 cannot be connected with the connector CN2 via the LAN cable of CAT-5, needless to make a connection judgment at the connector b of the LAN cable.

Furthermore, a case where the connector CN1 is 10/100/1000 Mbps, the connector CN2 is 100/1000 Mbps and the connectors are connected via the LAN cable of CAT-3 will be considered. When (4-1) and (4-2) are calculated just as in the above example, the characteristics transferred to the connector b of the LAN cable are changed from {i|u|ab}&{i} to LANSP:={i}. Since the characteristics of the connector CN2 are expressed as LANSP:={u|ab}, the judgment on the connector CN2(β) side is, $$\text{LANSP@S \& LANSP@O} := \{u\,|\,ab\} \,\&\, \{i\}$$
$$:= \phi \quad [\,==\phi\,]$$

and it is also proven that connection is not possible in this case either.

[Item Related to Pin Arrangement]

A LAN apparatus is generally designed to allow signals to be exchanged when wiring in a cable (here, twist pair cable) is straight without twisting in the connection between a PC which is a network terminal and a HUB which is a network relay. Therefore, in a PC-HUB cable connection, mutual transmission sections and reception sections correctly face each other via cables. However, when the same cable as that in the case of the PC-HUB cable connection is used for PC-PC cable connection and HUB-HUB cable connection, the transmission sections face each other and the reception sections face each other, and therefore some measures need to be taken.

Therefore, there are solutions such as:

a) Cable connection is changed.
   PC-HUB: straight cable
   PC-PC/HUB-HUB: cross cable
b) HUB-HUB/PC-PC connection dedicated connectors are mounted especially in the case of a network relay apparatus such as HUB. This also includes changes in the connection by a mechanical switch.
c) The validity of signal connection of the connection is automatically recognized on the connector side and internal connection is electrically changed so as to realize correct transmission and reception.

As these specifications, the connection array of the PC side connector is normally referred to as an "MDI" and the connection array of the HUB side connector is referred to as an "MDI-X." Since these are different only in the connection array and have the same shape, the specification is expressed as a script of electric characteristics, that is, variable characteristics. The characteristic name is assumed to be, for example, LANPIN because this is a connection array and the respective connection specification names are assumed to be the characteristic values. Here, suppose the characteristic value of the PC side connector is MDI and the characteristic value of the HUB side connector is MDX as an abbreviation of MDI-X.

(1) Definition of Connection Array Specification Characteristic on Connector Side (Example)

LANPIN:={MDI}:

Characteristic on network terminal side such as PC, WS, router

LANPIN:={MDX}:

Characteristic on network relay node side such as mainly HUB

LANPIN:={MDI|MDX}:

Characteristic of connector capable of automatically recognizing connection. This can be used for either terminal or relay node, but is normally properties of a network relay node.

(2) Connectability Between Connectors (2-1) Connection Matrix

Figures 7, 8, 9:
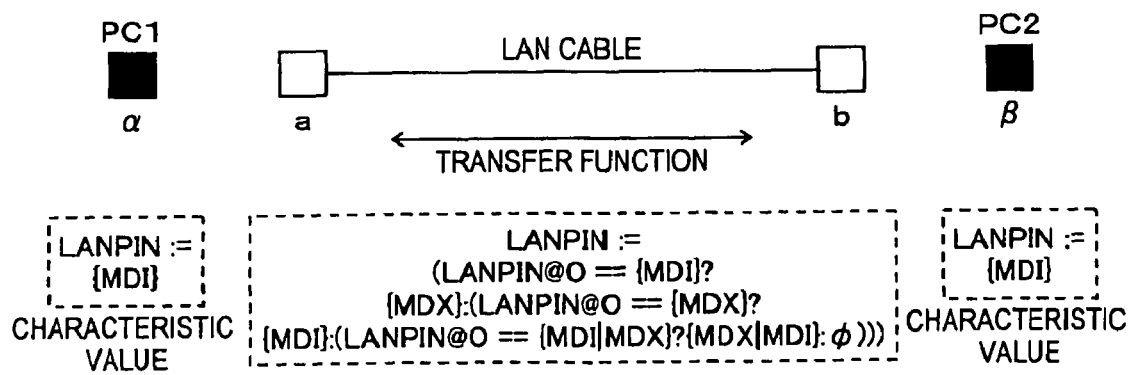
FIG. 7 shows a connection matrix.
FIG. 8 shows a table of characteristics of a straight cable and cross cable.
FIG. 9 illustrates an operation example of script.

FIG. 7 shows a connection matrix. Communication is possible between combinations of MDI and MDI-X(MDX). Connectable relationships are expressed in a matrix as shown in FIG. 7.

(2-2) Connection Judging Expression (Script)

Considering that a simple transfer function (:=identity function) is transferred by a connection judging expression, the following is the simplest.

Network terminal, network relay with no automatic recognition function
LANPIN@O except LANPIN@S!=φ
Network relay with automatic recognition function
No judging expression or identical expression such as LANPIN@O==LANPIN@O (3) Transfer Function of Cable Cables are classified into straight cables and cross cables by their connections and have the following properties.

Straight Cable:

The straight cable causes the connection specification of a connected connector to directly appear on a cable at the other end as is. That is, a cable connected to an MDI connector allows the connector at the other end of the cable to have MDI properties and a cable connected with an MDI-X connector allows the connector at the other end of the cable to have MDI-X properties. These cables have no directionality and no matter which end is connected to the connector, the other end which is an open end is provided with characteristics compatible with the above characteristics.

Cross Cable:

In the case of a cross cable in contrast to a straight cable, a cable connected to an MDI connector causes the connector at the other end of the cable to have properties of MDI-X and a cable connected to an MDI-X connector causes the connector at the other end of the cable to have properties of MDI. The cross cable has no directionality just as the straight cable.

FIG. 8 shows a table of characteristics of a straight cable and a cross cable. In FIG. 8, MDI|MDI-X is listed in no particular order of importance.

That is, with the straight cable, a transfer function is expressed as an identity function as follows.
LANPIN:=LANPIN@O Furthermore, the cross cable is expressed using a conditional expression as follows.

```
LANPIN := LANPIN@O == {MDI}?{MDX}:
(LANPIN@O == {MDX}?{MDI}:
(LANPIN@O == {MDI | MDX}?{MDX | MDI}:φ)
)
```

When connection specifications other than MDI and MDI-X are not taken into consideration, the cross cable can also be assumed as:

```
LANPIN := (LANPIN@O == φ
| | LANPIN@O == {MDI | MDX})?
LANPIN@O:LANPIN@O # {MDI | MDX}
```

(4) Script Operation Example

FIG. 9 illustrates an operation example of script. An example of script operation of pin connection characteristics when PC1 and PC2 are connected via a cross cable will be explained below using FIG. 9.

(4-1) Connection of Connector α of PC1 and Connector a of LAN Cable

Since the variable characteristics of the connector a of the LAN cable are "null," no connection judging expression is used and the characteristics are transferred from the connector a of the PC1 to the connector a of the LAN cable using a transfer function (supposed to be an identity function).

```
α: LANPIN := {MDI}
    → α: LANPIN := {MDI}
a: LANPIN := null
    → a: LANPIN := {MDI}
```

Though the description is omitted, the connection judging expression described in the connector a of the PC1 is likewise transferred to the connector a of the LAN cable using an identity function.

(4-2) The Characteristics of the Connector a of the LAN Cable are Transferred to the Connector b Using a Cable Transfer Function.

From the viewpoint at b, since "@O" expresses "characteristics of the LAN cable at the connector a," the characteristics are transferred to the connector b of the LAN cable by a transfer function as follows.

```
LANPIN :=
   (LANPIN@O == {MDI}?   {MDX}
   :(LANPIN@O == {MDX}?  {MDI}
   :(LANPIN@O == {MDI | MDX}?   {MDI | MDX}
   :           φ)))
```

Since the above expression has the same meaning as:

```
if      (LANPIN@O == {MDI})
           then LANPIN := {MDX}
else if (LANPIN@O == {MDX})
           then LANPIN := {MDI}
else if (LANPIN@O == {MDI | MDX})
           then LANPIN := {MDI | MDX}
else            LANPIN := φ)))
``` this matches the condition at the beginning, resulting in:
b: LANPIN:={MDX}

Though the description is omitted, the connection judging expression of the connector a of the LAN cable in this case is also transferred to the cable b as is through an identical conversion.

(4-3) Connection of Connector β of PC2 and Connector b of LAN Cable

Since the variable characteristic of the connector b of the LAN cable is not "null," the connector transfer function of the connector β of the PC2 is not used here and connectability is judged using connection judging expressions of the connector b of the LAN cable and the connector β of the PC2.

Figure 10A:
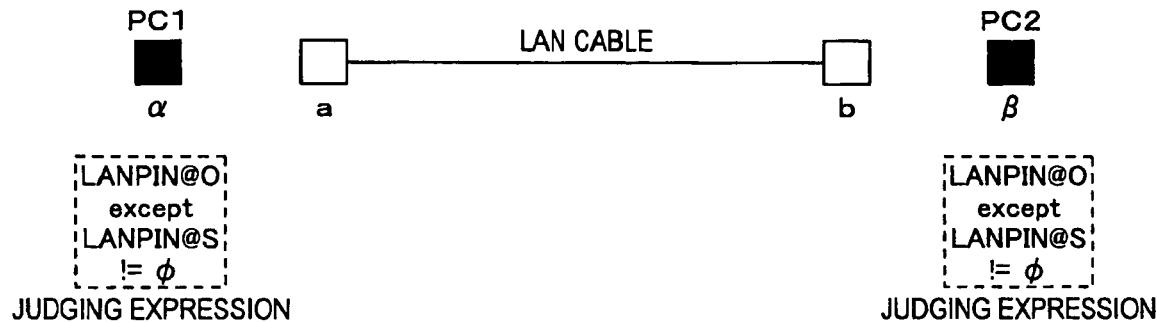
FIGS. 10A and 10B show a connection judging expression of each connector.
Figure 10B:
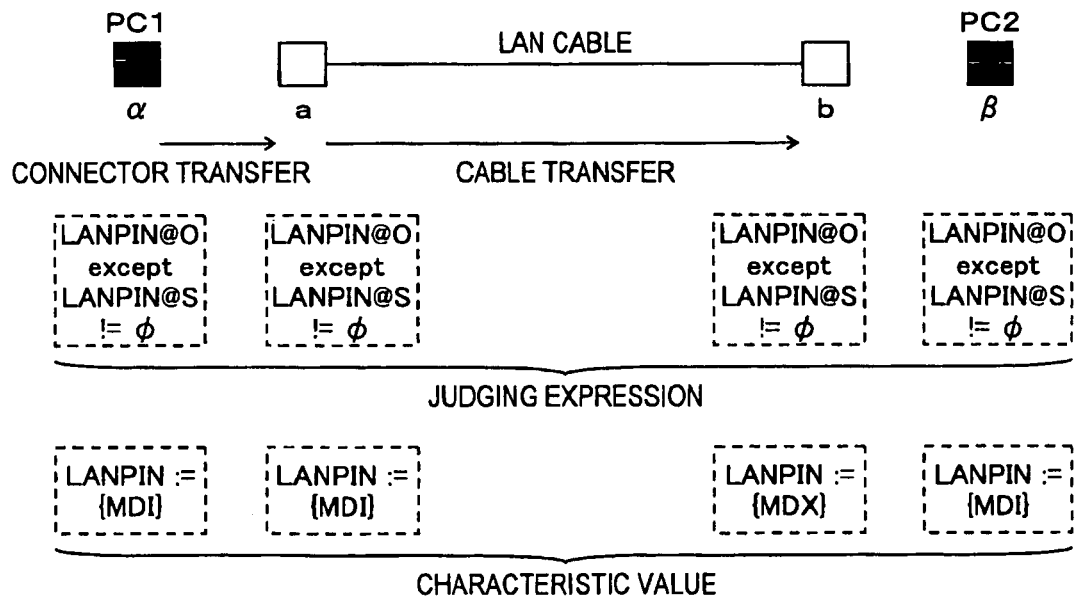

FIG. 10 shows connection judging expressions of the respective connectors. FIG. 10A shows an initial condition and FIG. 10B shows a condition after the characteristics have been transferred from the connector a of the LAN cable to the connector b. Although the descriptions of the connection judging expressions have been omitted so far, the judging expressions from (2-2) onward are as shown in FIG. 10A and FIG. 10B. FIG. 10B also shows the characteristic values calculated so far.

(4-4) Connection Judgement of PC1 at Connector β
LANDPIN@S:={MDI}, LANPIN@O:={MDX} is used as the characteristic value.

```
LANPIN@O except LANPIN@S :=
{MDX} except {MDI} :=
{MDX}                    [!=φ]
```

Since the result is not an empty set, the judgment is "OK."
(4-5) Connection Judgment of LAN Cable at Connector b
LANP1N@S:={MDX}, LANPIN@O:={MDI} is used as the characteristic value.

---
LANPIN@O except LANPIN@S :=
{MDI} except {MDX} :=
{MDI}                       [ != φ ]
---

Since the result is not an empty set, the judgment is "OK."
Since both judging expressions are "OK," the connectability of this connection point is "OK." Therefore, it has been proven that the connector a of the PC1 and the connector β of the PC2 can be connected via a cross cable.

[Merge of Items Related to IEEE802.3-Based Protocol and Pin Arrangement]

Various characteristics have been observed separately so far, but the actual connectors have these characteristics all together. Therefore, when both characteristics are merged, the examples shown in FIG. 5 and FIG. 9 are finally as shown below.

Connector α: Connector of PC of 10/100 Mbps
Characteristic Value:
LANSP:={i|u},LANPIN:={MDI}
Connection judging expression ---
LANSP@S & LANSP@O != φ &&
LANPIN@O except LANPIN@S != φ
---

Connector a, connector b:CAT-5 cross LAN cable
Transfer function:

---
LANSP :=LAN@O & {i | u},
LANPIN := LANPIN@O == {MDI}?{MDX}:
  (LANPIN@O == {MDX}?{MDI}:
    (LANPIN@O == {MDI | MDX}?{MDX | MDI}:φ)
)
---

Connector β: connector of PC of 10/100/1000 Mbps
Characteristic value:
LANSP:={i|u|ab},LANPIN:={MDX}
Connection judging expression ---
LANSP@S & LANSP@O != φ &&
LANPIN@O except LANPIN@S != φ
---

As for the rest, when calculations in (4-1), (4-2) and (4-3) are carried out just as in the above example, the connectors are finally judged to be connectable. What should be noted here is that while a plurality of types of characteristic names of characteristic values are only enumerated with ",", the characteristic values of a connection judging expression are linked as a logical expression (logical product "&&" in this example). The connection may be logical OR "||" or others depending on circumstances.

The definition/operation examples of the variable characteristic script according to the present embodiment have been explained so far. The connection consistency check/cable selection unit 103 that carries out cable selection processing using such a script will be explained in detail below.

Figure 11:
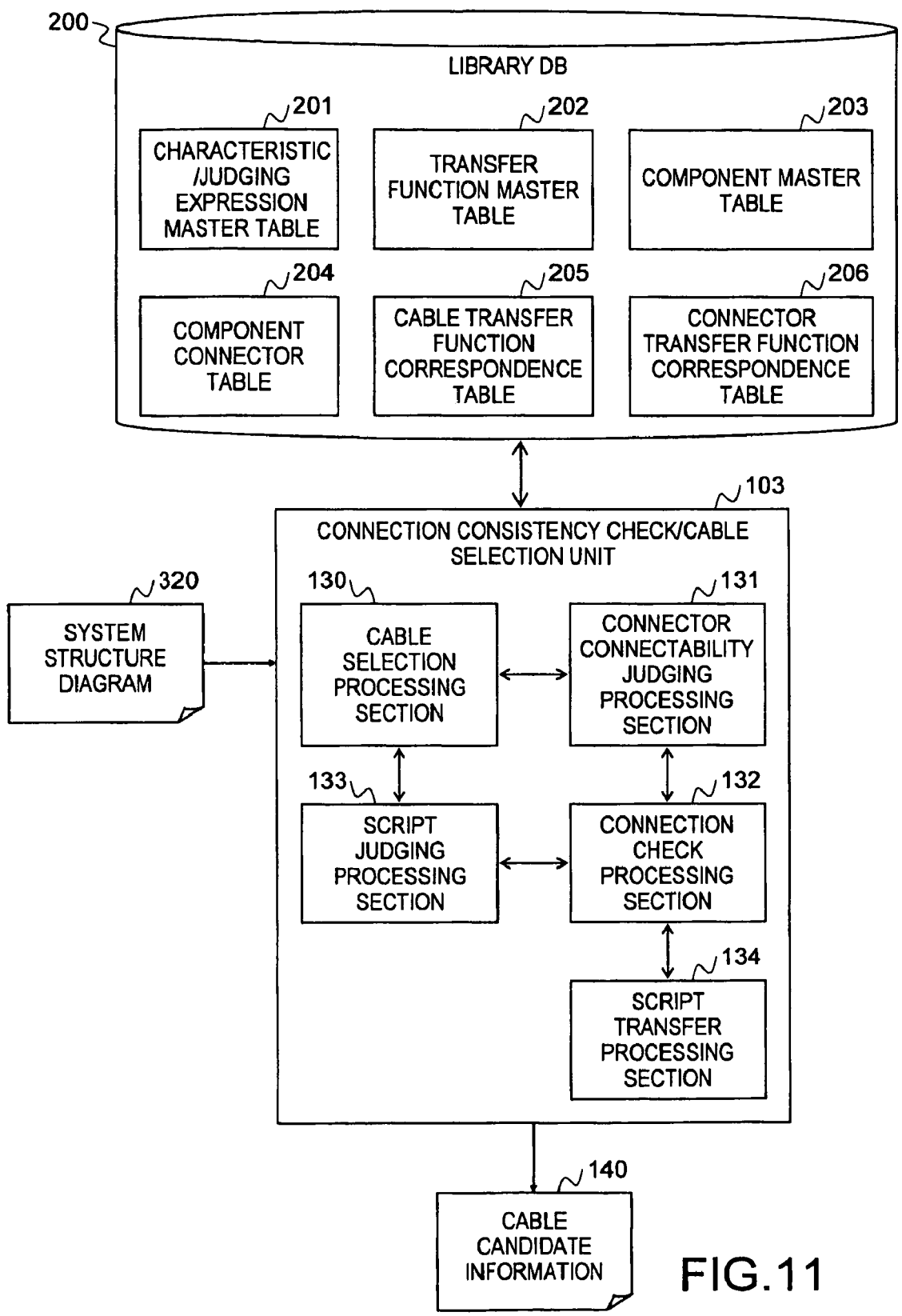
FIG. 11 shows configuration examples of the connection consistency check/cable selection unit and library DB according to the present embodiment.

FIG. 11 shows a configuration example of the connection consistency check/cable selection unit and the library DB according to the present embodiment. In FIG. 11, the system structure diagram 320 is a drawing created by the CAD device 300. Actually, the system structure diagram 320 is not directly inputted to the connection consistency check/cable selection unit 103, but an internal data object created from the CAD internal information 310 of the system structure diagram 320 is inputted to the connection consistency check/cable selection unit 103. Cable candidate information 140 is information of a cable extracted from the library DB 200 by the connection consistency check/cable selection unit 103 as a cable candidate to connect components arranged on the system structure diagram 320.

The connection consistency check/cable selection unit 103 is provided with a cable selection processing section 130, a connector connectability judging processing section 131, a connection check processing section 132, a script judging processing section 133 and a script transfer processing section 134.

The cable selection processing section 130 performs overall processing of extracting a cable candidate that can be used to connect components on the system structure diagram 320 from the library DB 200. The connector connectability judging processing section 131 performs processing of managing judgment on connectability between components using a certain cable. The connection check processing section 132 performs processing of checking whether a connection between components using a certain cable is possible or not. The script judging processing section 133 judges whether connectors are connectable with each other or not. The script transfer processing section 134 performs processing of transferring variable characteristics/variable judging expressions between connectors to be connected or from a connector to another connector in the cable.

A characteristic/judging expression master table 201, a transfer function master table 202, a component master table 203, a component connector table 204, a cable transfer function correspondence table 205 and a connector transfer function correspondence table 206 are registered with the library DB 200. Hereinafter, examples of the characteristic/judging expression master table 201, transfer function master table 202, component master table 203, component connector table 204, cable transfer function correspondence table 205, connector transfer function correspondence table 206 registered with the library DB 200 will be explained using FIG. 12 to FIG. 17.

FIG. 12 shows a configuration example of the characteristic/judging expression master table. The characteristic/judging expression master table 201 is a table that stores scripts of characteristic value sets and scripts of judging expressions. The characteristic/judging expression master table 201 has information on characteristic codes, fixed characteristics, fixed judging expressions, variable characteristics and variable judging expressions or the like.

A characteristic code is identification information that uniquely identifies each record of the characteristic/judging expression master table 201 and is information for specifying a connector group to which the same characteristic/judging expression is applied. Fixed characteristics are definition information of a script of a fixed characteristic value set. A fixed judging expression is definition information of a connection judging expression script of the fixed characteristic. Variable characteristics are definition information of a script of a variable characteristic value set. A variable judging expression is definition information of a connection judging expression script of the variable characteristic.

FIG. 13 shows a configuration example of the transfer function master table. The transfer function master table 202 is a table that saves definition information of transfer function scripts. The transfer function master table 202 includes information such as function codes, types, conversion types and transfer function definitions.

A function code is identification information that uniquely identifies each record of the transfer function master table 202 and is information for specifying a connector group or cable group to which the same transfer function is applied. A type is information indicating whether the transfer function is for a cable or for a connector. A conversion type is information indicating whether the transfer function is for a characteristic value or for a judging expression. Whether the transfer function is for a cable or for a connector, or for a characteristic value conversion or for a judging expression conversion is determined by a script definition. A transfer function is definition information of a transfer function script. Suppose a transfer function which is "null" is an "identical conversion."

FIG. 14 shows a configuration example of the component master table. The component master table 203 is a table that saves various set values of components. The component master table 203 includes information of component codes, names, component types or the like. In this example, not only network apparatuses but also cables are registered with the component master table 203 beforehand as a type of components, but cables may be managed in another table as a cable master table.

A component code is identification information for uniquely identifying each record of the component master table 203. A name is information showing the name of the component. A component type is information showing the type of the component.

FIG. 15 shows a configuration example of the component connector table. The component connector table 204 is an information table of connectors belonging to components. The component connector table 204 includes information such as connector IDs, connector codes, component codes and characteristic codes.

A connector ID is identification information for uniquely identifying each record of the component connector table 204. A connector code is identification information of a connector which is unique in a component. A component code is information linked to a component code of the component master table 203. A characteristic code is information linked to a characteristic code of the characteristic/judging expression master table 201.

FIG. 16 shows a configuration example of the cable transfer function correspondence table. The cable transfer function correspondence table 205 is a table that links a transfer function used to transfer a characteristic/judging expression in a cable with an actual component (cable). The cable transfer function correspondence table 205 has information of component codes, function codes, start point connector IDs, end point connector IDs or the like.

A component code is information linked to a component code of the component master table 203. A function code is information linked to a function code of the transfer function master table 202. A start point connector ID is a connector ID of a connector which becomes a conversion start point and is information linked to a connector ID of the component connector table 204. An end point connector ID is an ID of the connector which becomes a conversion end point and is information linked to a connector ID of the component connector table 204.

The start point connector ID and end point connector ID indicate from which connector to which connector a transfer function of a multi-terminal cable should be used when a characteristic value or judging expression is transferred. Furthermore, even a two-terminal cable is used for a cable whose signal passage has directionality. "−1" is a default value and is used when there is no specific corresponding description of a connector ID of interest. The above definition has the same value as when (CBL1, CAT5CBP, 1, 2), (CBL1, CAT5CBP, 2, 1) are written. One specific example where the start point connector ID and end point connector ID are used is a cable for a console switch or the like that integrates a mouse/keyboard/display cable.

FIG. 17 shows a configuration example of the connector transfer function correspondence table. The connector transfer function correspondence table 206 is a correspondence table between connectors and transfer functions when a characteristic value or judging expression is transferred from a connector to a cable. The connector transfer function correspondence table 206 has information such as connector IDs and function codes.

A connector ID is information linked to a connector ID of the component connector table 204. A function code is information linked to a function code of the transfer function master table 202. When data is transferred from a connector to a cable, the data is never transferred from the cable to the connector, and therefore the direction is determined. Therefore, the concept of a start point/end point is unnecessary.

Next, an example of processing by the connection consistency check/cable selection unit 103 of the present embodiment will be explained using flowcharts from FIG. 18 to FIG. 23. The following processing is processing of extracting cable candidates of one of connection relationships on the system structure diagram 320. All cable candidates necessary for a designed system can be extracted by repeating the following processing for all connection relationships on the system structure diagram 320.

Figure 18:
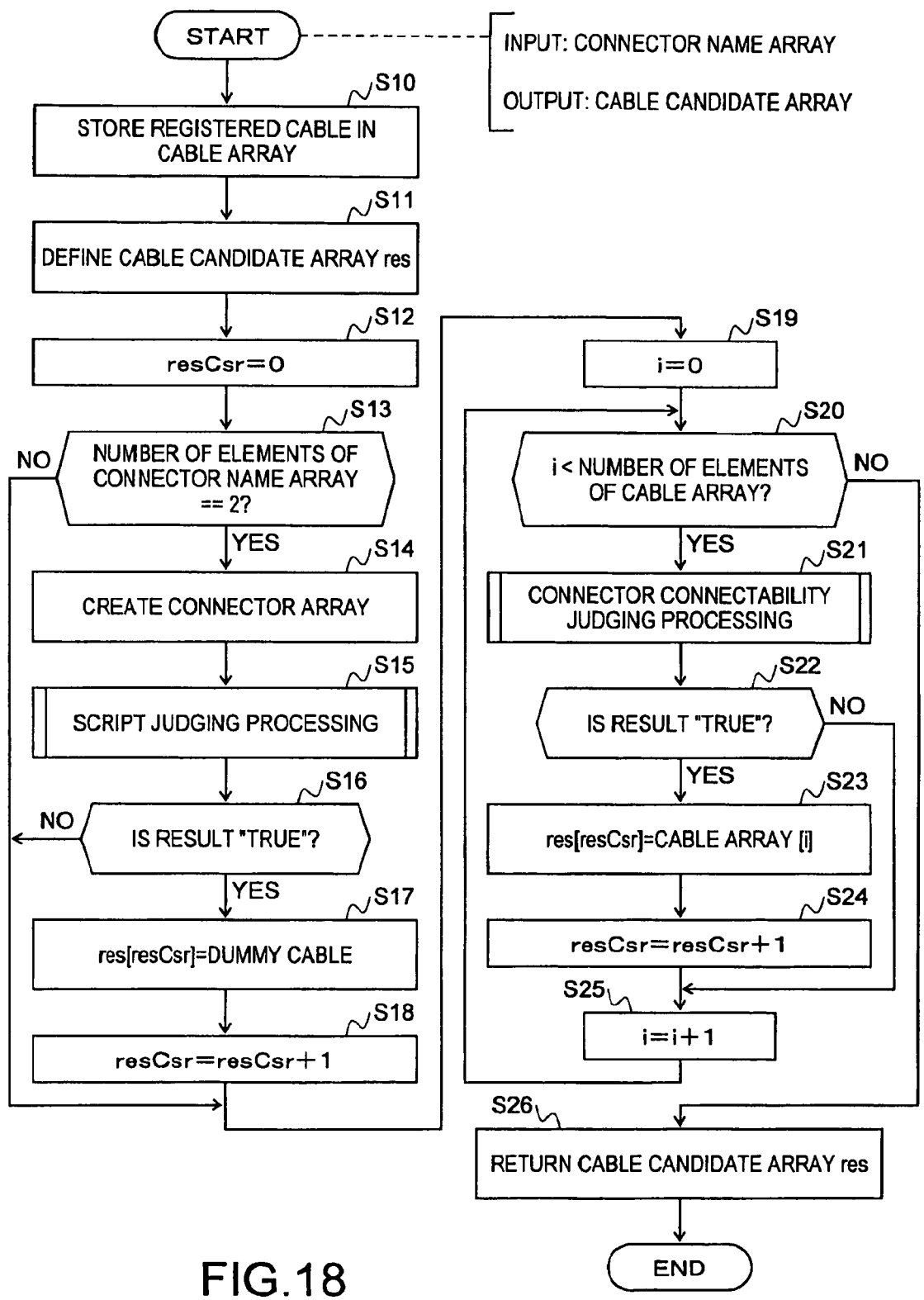
FIG. 18 is a cable selection processing flowchart.

FIG. 18 is a cable selection processing flowchart. In the cable selection processing (including connection consistency check processing) in FIG. 18, a connector name array is inputted as an argument. The connector name array is information of connectors of components to be connected about a connection relationship from which cable candidates are extracted in the process this time. The connector name array has component codes and connector names specified by the connector codes as elements. The output of the cable selection processing is a cable candidate array (array name is assumed to be "res"), which stores selection results of cables that can connect connectors with each other in the connector array given as input.

First, a cable registered with the library DB 200 is stored in the cable array (step S10). To be more specific, the component master table 203 of the library DB 200 is searched using a component type "cable," component codes of the corresponding components are collected and stored in the cable array. In this case, all cables registered with the library DB 200 may be stored, but since a considerable number of cables are registered with the library DB 200, it is practically preferable to make a simple selection using other information and reduce the number of cables beforehand. The cable array has component codes as elements.

A cable candidate array "res" is prepared (step S11) and an index (cursor variable) "resCsr" of the cable candidate array is initialized to 0 (step S12). The cable candidate array is an array having cable component codes as elements. Furthermore, names obtained by looking up the component master table of the library DB 200 using a component code may also be assumed to be elements.

When the number of elements of the connector name array is 2, connectors may also be directly connected with each other. If connectors can be directly connected with each other, a dummy cable indicating that cables may be unnecessary is added to the cable candidate array "res." Therefore, whether the number of elements of the connector name array is 2 or not is judged (step S13) and if the number of elements is 2, the following processing from step S14 to step S18 is performed. First, a connector array is created (step S14). To be more specific, the component connector table 204 of the library DB 200 is looked up using the component code and connector code of the connector name array and a characteristic code is thereby acquired. The characteristic/judging expression master table 201 of the library DB 200 is looked up using the acquired characteristic code and fixed characteristics, fixed judging expression, variable characteristics and variable judging expression are thereby obtained. The fixed characteristics, fixed judging expression, variable characteristics and variable judging expression obtained are stored in the connector array. Here, the connector array is an array having the fixed characteristics, fixed judging expression, variable characteristics and variable judging expression as elements.

Script judging processing (see FIG. 22) is performed using the fixed/variable characteristics and fixed/variable judging expression of a connector array [0], and the fixed/variable characteristics and fixed/variable judging expression of a connector array [1] as arguments (step S15). When the result of the script judging processing is "true" (step S16), a dummy cable is stored in the cable candidate array res[resCsr] (step S17) and index resCsr of the array is incremented (step S18).

Next, index i of the cable array is initialized to 0 for performing connector connectability judging processing on all cables in the cable array (step S19).

If i<the number of elements of the cable array (step S20), there are unjudged cables, and so connector connectability judging processing (see FIG. 19) is performed using the connector name array and cable array [i] as arguments (step S21). When the result of the connector connectability judging processing is "true" (step S22), the cable array [i] is stored in the cable candidate array res[resCsr] (step S23) and the index resCsr is incremented (step S24). i is incremented (step S25), the process is returned to the process in step S20 and the process is repeated likewise.

When i becomes the number of elements of the cable array (step S20), since all cables are assumed to have been judged, the cable candidate array res is returned to the invoking source of the processing as a result of the cable selection processing (step S26) and the process is ended. That is, cables whose connector connectability judging processing result is "true" are collected and the array of the cables becomes a return value.

Figure 19:
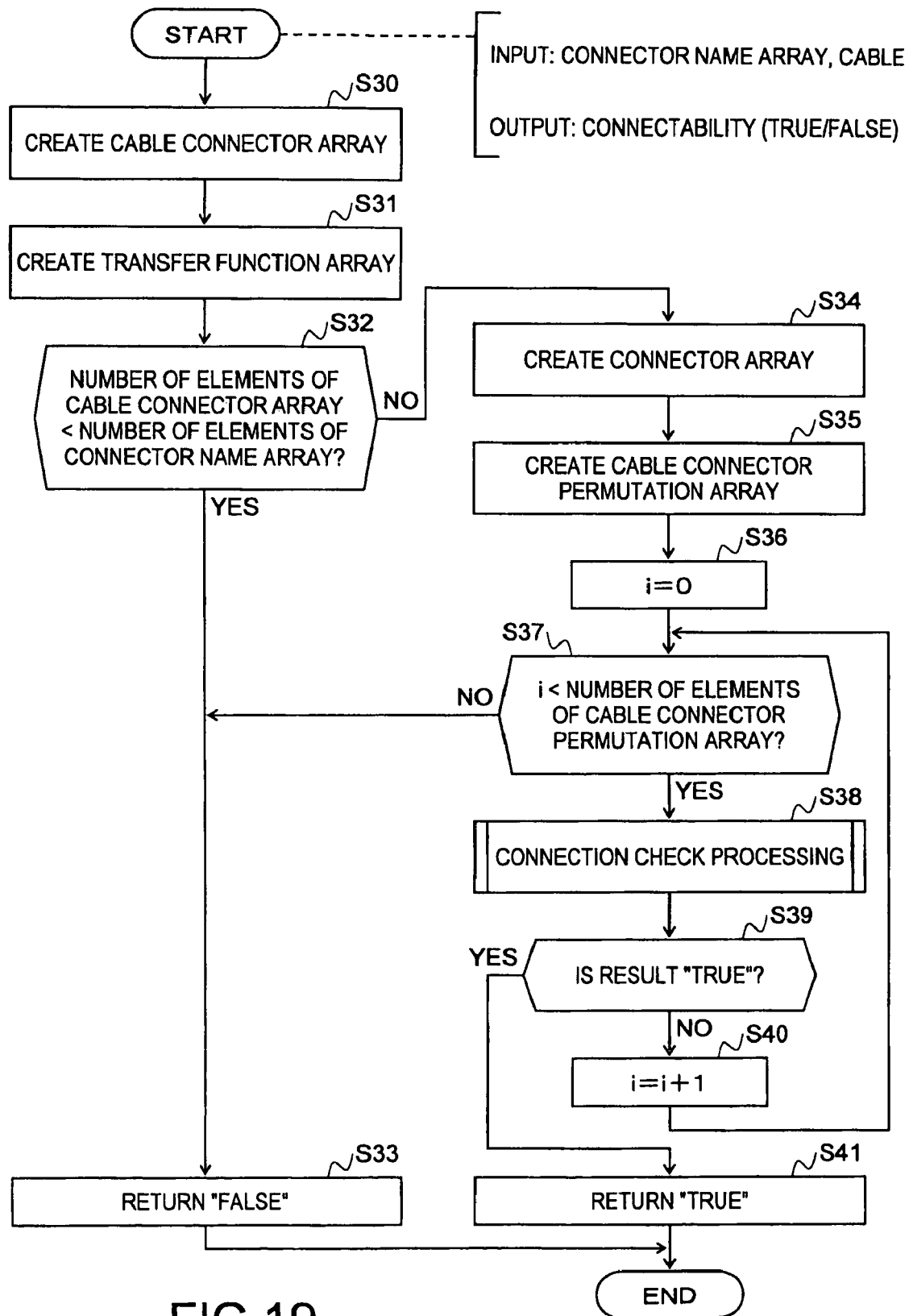
FIG. 19 is a connector connectability judging processing flowchart.

FIG. 19 is a connector connectability judging processing flowchart. In the connector connectability judging processing of FIG. 19, one element (component code of the cable) of the connector name array and cable array is inputted as an argument. The output of the connector connectability judging processing is a logical value of "true/false" as to whether a specified cable is connectable to a connector specified by the connector name array or not.

A cable connector array is created (step S30). To be more specific, the component connector table 204 of the library DB 200 is looked up using a component code of each element of the cable array and a characteristic code is acquired. Since the component is a cable, a plurality of characteristic codes are acquired. The characteristic/judging expression master table 201 of the library DB 200 is looked up using the acquired characteristic code and fixed characteristics and a fixed judging expression are acquired. The acquired fixed characteristics and fixed judging expression are stored in the cable connector array. The cable connector array is an array having a connector ID, fixed characteristics and fixed judging expression as elements.

Next, a transfer function array is created (step S31). To be more specific, the cable transfer function correspondence table 205 of the library DB 200 is looked up using a component code of each element of the cable array and a function code, start point connector ID and end point connector ID are acquired. The transfer function master table 202 of the library DB 200 is looked up using the acquired function code and a conversion type and transfer function are acquired. The acquired start point connector ID, end point connector ID, conversion type and transfer function are stored in the transfer function array. The transfer function array is an array having the start point connector ID, end point connector ID, conversion type and transfer function as elements.

The number of elements of the cable connector array is compared with the number of elements of the connector name array (step S32). When the number of elements of the cable connector array<the number of elements of the connector name array, "false" is returned as the result (step S33) and the process is ended. When the number of elements of the cable connector array, that is, the number of connectors of the cable, is smaller than the number of elements of the connector name array, that is, the number of connectors to be connected, it is self-evident that this cable cannot connect all the given connectors.

When the judgment in step S32 does not result in the number of elements of the cable connector array<the number of elements of the connector name array, a connector array is created (step S34). To be more specific, the component connector table 204 of the library DB 200 is looked up using the component code and connector code of the connector name array and a characteristic code is acquired. The characteristic/judging expression master table 201 of the library DB 200 is looked up using the acquired characteristic code and fixed characteristics, fixed judging expression, variable characteristics and variable judging expression are obtained. The fixed characteristics, fixed judging expression, variable characteristics and variable judging expression obtained are stored in the connector array. Here, the connector array is an array having the fixed characteristics, fixed judging expression, variable characteristics and variable judging expression as elements.

Next, a cable connector permutation array is created (step S35). The cable connector permutation array is an array having a permutation of elements of the cable connector array as elements. The respective elements of the cable connector permutation array are elements of the cable connector array arranged in a certain sequence and the elements of the cable connector array of a different sequence are stored for every element of the cable connector permutation array. The reason that the cable connector is developed into a permutation is to guarantee that there is always a storage sequence of matching cable connectors no matter in what sequence elements in the connector array are given when the current cable is connectable with a given connector since it is unknown what connector is stored in a given connector array in what sequence. The index i of the cable connector permutation array is initialized to 0 (step S36).

Unless i<the number of elements of the cable connector permutation array (step S37), "false" is returned as the result (step S33) and the process is ended. Connectability is judged for all elements of the cable connector permutation array and if all are "false," it is obvious that the connector to which this cable is given cannot be connected.

If i<the number of elements of the cable connector permutation array (step S37), connection check processing (see FIG. 20) is performed using the connector array, cable connector permutation array [i] and transfer function array as arguments (step S38).

When the result of the connection check processing is not "true" (step S39), i is incremented (step S40), the process is returned to the process in step S37 and the process is repeated on the elements of the next cable connector permutation array likewise.

If the result of the connection check processing is "true" (step S39), "true" is returned to the invoking source as the result (step S41) and the process is ended. That is, since the permutation element of the connectable cable connector array exists, "connectable" is returned as a return value.

Figure 20:
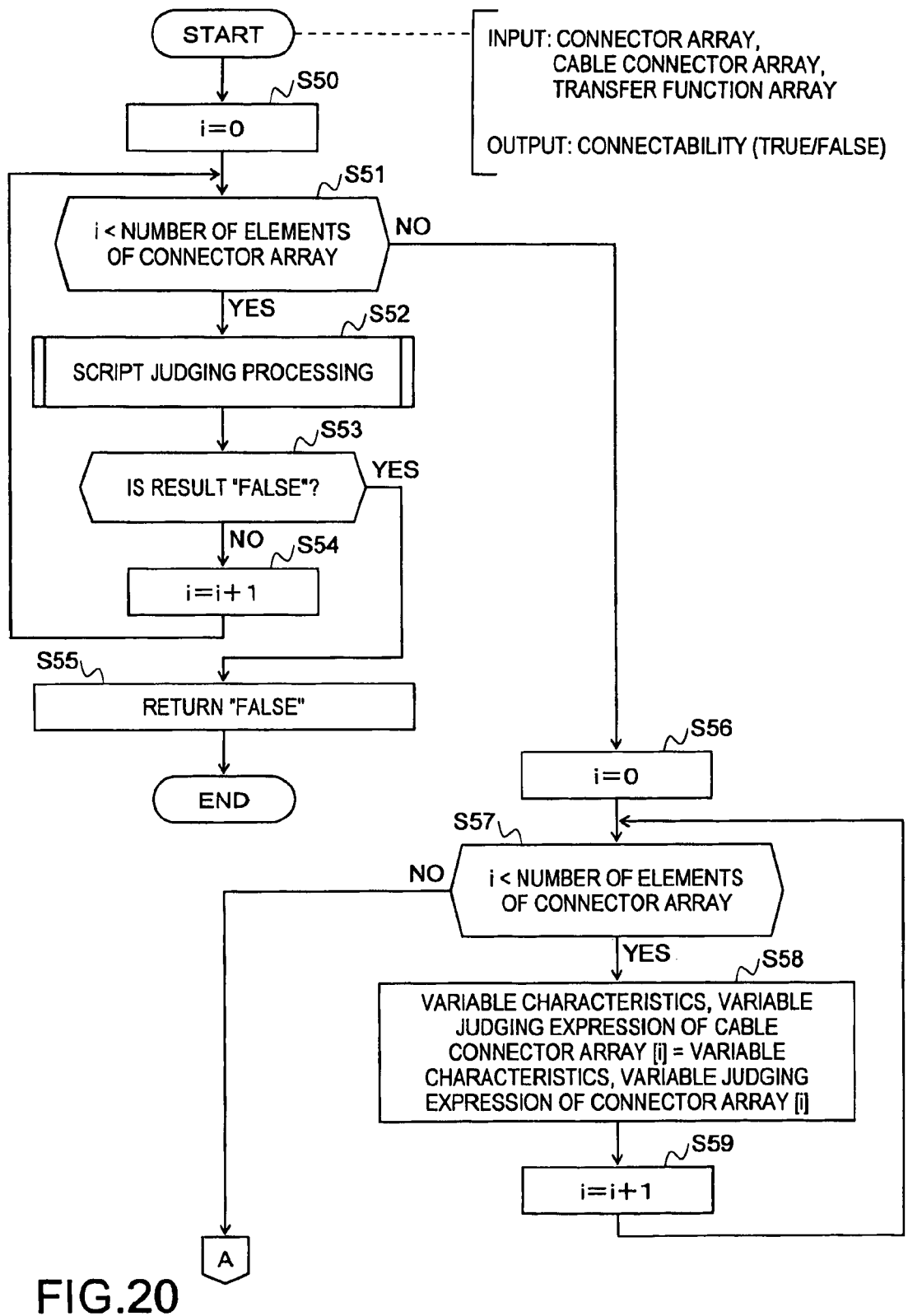
FIG. 20 is a connection check processing flowchart.
Figure 21:
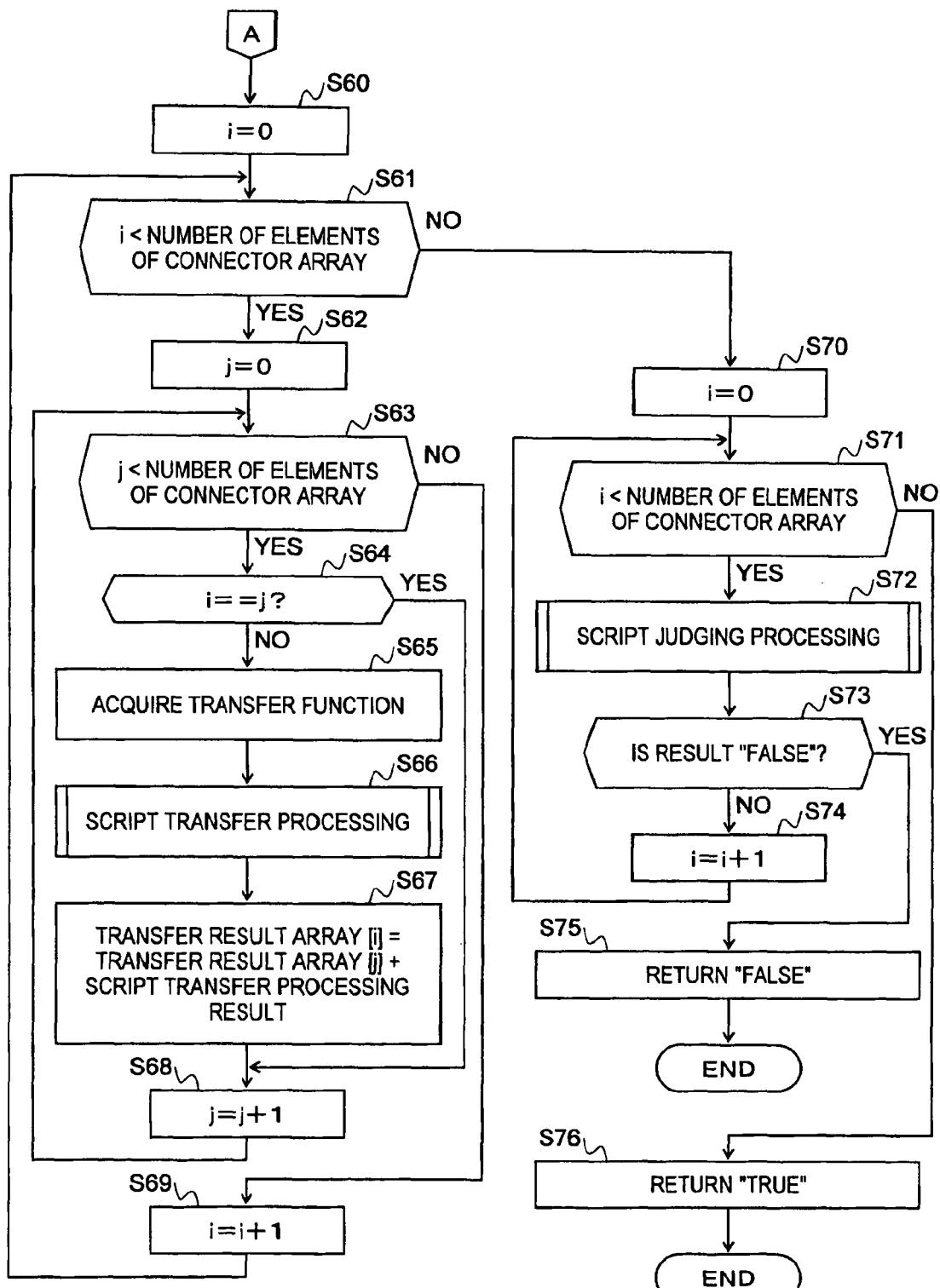
FIG. 21 is a connection check processing flowchart.

FIG. 20 and FIG. 21 are connection check processing flowcharts. In the connection check processing in FIG. 20 and FIG. 21, the connector array, cable connector array and transfer function array are inputted as arguments. Here, the cable connector array to be inputted is one element of the cable connector permutation array. The output of the connection check processing is a "true/false" value which is "true" when connection is possible and "false" when connection is not possible.

First, index i of the connector array and cable connector array is initialized to 0 (step S50).

When i<the number of elements of the connector array (step S51), script judging processing (see FIG. 22) is performed using the fixed characteristics and fixed judging expression of the connector array [i], and the fixed characteristics and fixed judging expression of the cable connector array [i] as arguments (step S52).

When the script judging processing result is not "false" (step S53), i is incremented (step S54) and the process returns to the process in step S51.

When the result of the script judging processing is "false" (step S53), "false" is returned as the result (step S55) and the process is ended. When the script check of the fixed characteristic/fixed judging expression results in "false," that is, when "not connectable" is returned, "false" may be returned, needless to make any script check on the variable characteristic/variable judging expression.

When the results of all the fixed characteristic/fixed judging expression script checks are "true" and i becomes the number of elements of the connector array (step S51), index i is initialized to 0 for the next check (step S56).

When i<the number of elements of the connector array (step S57), the variable characteristics and variable judging expression of the connector array [i] are assigned to the variable characteristics and variable judging expression of the cable connector array [i] (step S58). This expresses the transfer of a variable characteristic value from a connector to a cable. Here, the connector transfer function is an identity function. When the transfer function is not an identity function, transfer by script is used. Index i is incremented (step S59), the process returns to the process in step S57 and the process is repeated on the next array element likewise.

When the process is performed on all array elements and i becomes the number of elements of the connector array (step S57), index i is initialized to 0 for the next processing (step S60).

When i<the number of elements of the connector array (step S61), index j is initialized to 0 (step S62).

When j<the number of elements of the connector array, the process moves to step S64 or moves to step S69 otherwise (step S63). In step S64, a judgment is made as to whether i is equal to j or not and if i is equal to j, the process moves to step S68, j is incremented (step S68) and the process returns to the process in step S63.

When i is not equal to j (step S64), a transfer function from a cable connector to a cable connector is searched and acquired from the cable transfer function array and assigned to the transfer function (step S65). In the search from the transfer function array, the connector ID of the cable connector array [i] is assumed to be a start point connector ID, the connector ID of the cable connector array [j] is assumed to be an end point connector ID, and the transfer function where the start point and end point match is assumed to be the search result. When there is no transfer function where the start point and end point match, a search is performed assuming either the start point or end point is −1. When no match is still found, a search is performed again assuming both the start point and end point are −1. Ensuring that one transfer function is found at any one of the three stages is an item guaranteed when data is created. When assignment to the transfer function is completed, script transfer processing (see FIG. 23) is then performed assuming the transfer function, the variable characteristics and variable judging expression of the cable connector array [i] as arguments (step S66). This expresses a transfer of a characteristic value from a cable connector to another cable connector by the cable transfer function.

The variable characteristics and variable judging expression obtained by script transfer processing are added to the transfer result array [j] (step S67). The transfer result array has the variable characteristics and variable judging expression as elements. "+" in step S67 of FIG. 21 denotes a merge of the characteristic values. j is incremented (step S68) and the process returns to the process in step S63.

When j becomes the number of elements of the connector array (step S63), i is incremented (step S69), the process returns to the process in step S61 and the process is repeated likewise.

By cycling such a transfer process for i and j, the characteristic values in all combinations of transfer functions are transferred. The transfer process is cycled according to not the number of elements of the cable connector array but the number of elements of the connector array because cable connectors with no connectors connected can be ignored.

When i becomes the number of elements of the connector array (step S61), index i of the connector array for the script judging processing is initialized to 0 (step S70).

When i<the number of elements of the connector array (step S71), script judging processing (see FIG. 22) is performed assuming the variable characteristics and variable judging expression of the cable connector array [i] and the variable characteristics and variable judging expression of the transfer result array [i] as arguments (step S72).

When the script judging processing result is not "false" (step S73), index i is incremented (step S74), the process returns to the process in step S71 and the process is repeated likewise.

When the script judging processing result is "false" (step S73), "false" is returned as the result (step S75) and the process is ended.

When i becomes the number of elements of the connector array (step S71), "true" is returned as the result (step S76) and the process is ended. When the results of the variable characteristics and variable judging expression through the script judging processing are "true" in all cable connectors associated with the connector, the result of the connection check processing also becomes "true," that is, connectable.

Figure 22:
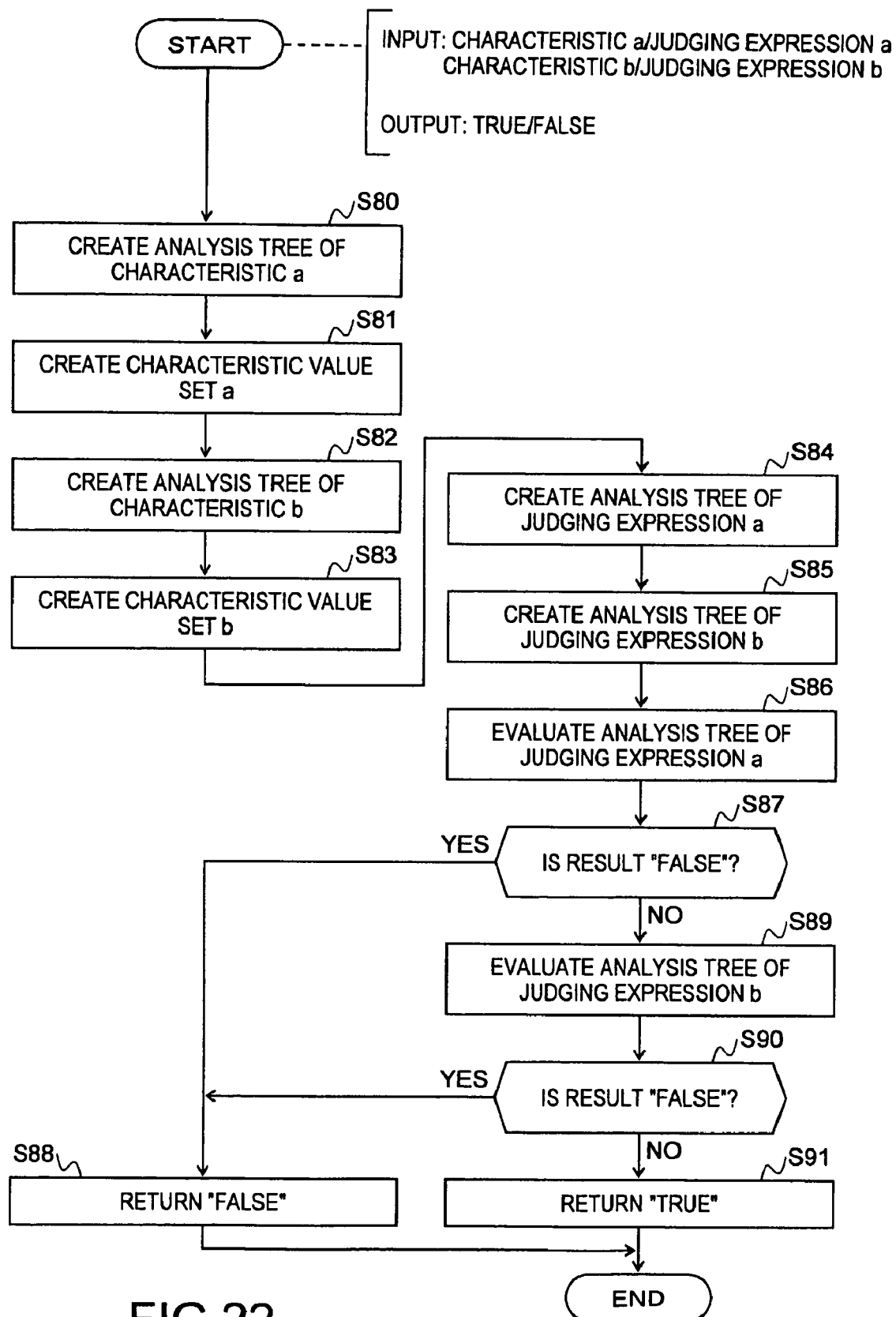
FIG. 22 is a script judging processing flowchart.

FIG. 22 is a script judging processing flowchart. The script judging processing in FIG. 22 is assumed to have characteristic a, judging expression a, characteristic b and judging expression b as arguments. The characteristic a and characteristic b are characteristic value set scripts. The judging expression is a connection judging expression script. The output is "true/false" of the evaluation result.

The characteristic a is analyzed and an analysis tree of the characteristic a is created (step S80). The script analysis method can be implemented using syntactic processing such as LLk and LRk. lex/yacc and javacc or the like can be used as these analysis tools. Since a more detailed algorithm of LLk or LRk is described in commercially available books of various computer languages, detailed explanations will be omitted here. The analysis tree of the characteristic a is evaluated and a characteristic value set a is created (step S81).

Likewise, the characteristic b is analyzed and an analysis tree of the characteristic b is created (step S82). The analysis tree of the characteristic b is evaluated and a characteristic value set b is created (step S83). The judging expression a is analyzed and an analysis tree of the judging expression a is created (step S84). The judging expression b is analyzed and an analysis tree of the judging expression b is created (step S85).

By defining the characteristic value set a as the self side and the characteristic value set b as the other party side, the analysis tree of the judging expression a is evaluated (step S86). The "self side" refers to the one whose variable suffix in the script is expressed by "@S" and the "other party side" refers to the one whose variable suffix in the script is expressed by "@O." If the evaluation result is "false" (step S87), "false" is returned as the result (step S88) and the process is ended.

Likewise, by defining the characteristic value set b as the self side and the characteristic value set a as the other party side, the analysis tree of the judging expression b is evaluated (step S89). When the evaluation result is "false" (step S90), "false" is returned as the result (step S88) and the process is ended.

When both the evaluation result in step S86 and the evaluation result in step S89 are "true" (step S87, step S90), "true" is returned as the result (step S91) and the process is ended.

Figure 23:
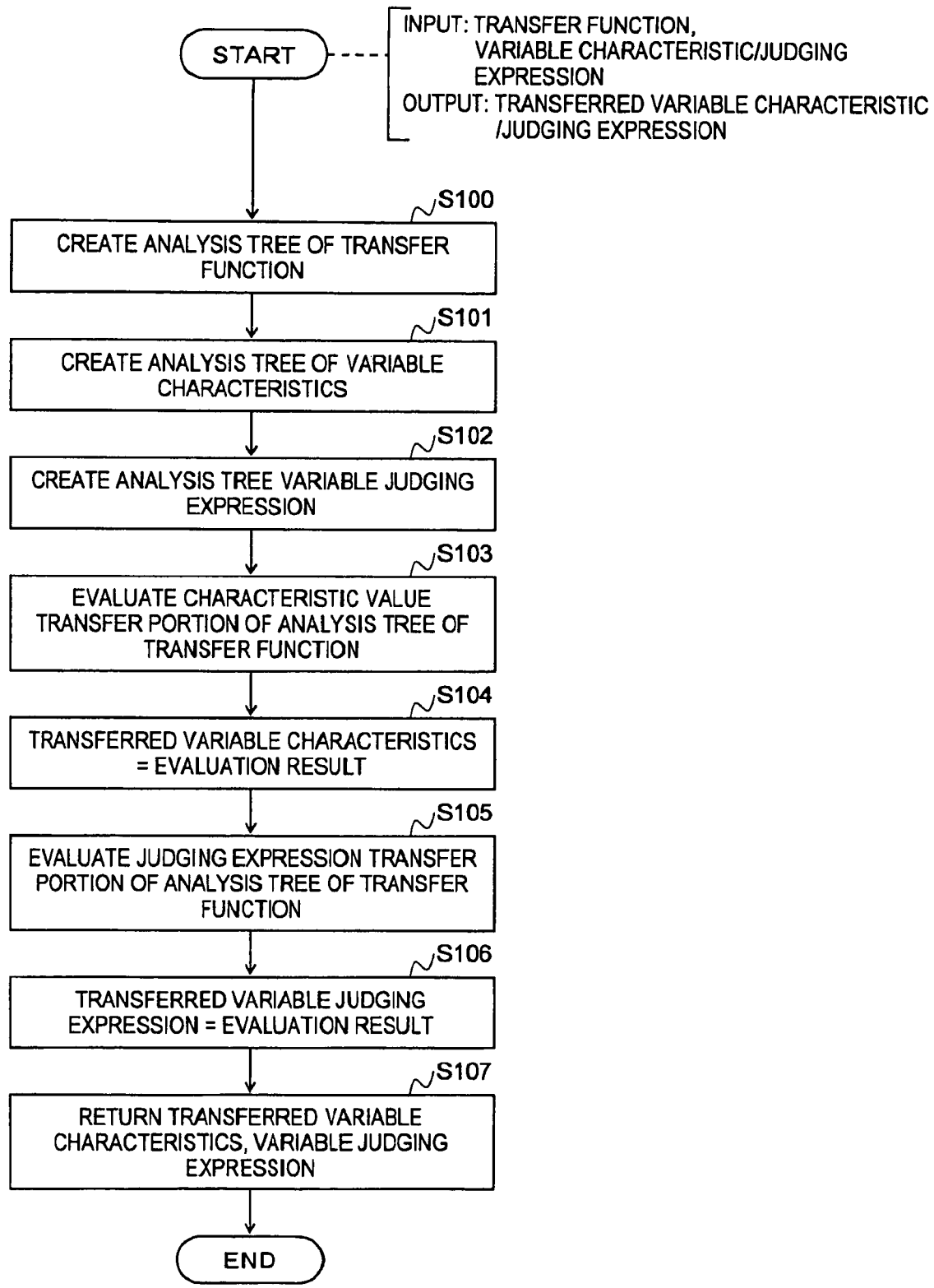
FIG. 23 is a script transfer processing flowchart.

FIG. 23 is a script transfer processing flowchart. In the script transfer processing in FIG. 23, the transfer function, variable characteristics and variable judging expression are assumed to be arguments. The outputs are the transferred variable characteristics and variable judging expression.

A transfer function is analyzed and an analysis tree of the transfer function is created (step S100). The variable characteristics are analyzed and an analysis tree of the variable characteristics is created (step S101). The variable judging expression is analyzed and an analysis tree of the variable judging expression is created (step S102).

Assuming the variable characteristics are the characteristics of the other party side, the characteristic value transfer portion of the analysis tree of the transfer function is evaluated (step S103). The evaluation result is assumed to be transferred variable characteristics (step S104). Likewise, assuming the variable judging expression as the judging expression of the other party side, the judging expression transfer portion of the analysis tree of the transfer function is evaluated (step S105). The evaluation result is assumed to be the transferred variable judging expression (step S106). The transferred variable characteristics and variable judging expression are returned to the invoking source as the result (step S107) and the process is ended.

Next, a specific example where a cable connecting the components with each other is selected based on the system structure diagram created by the CAD device 300 will be explained.

Figure 24:
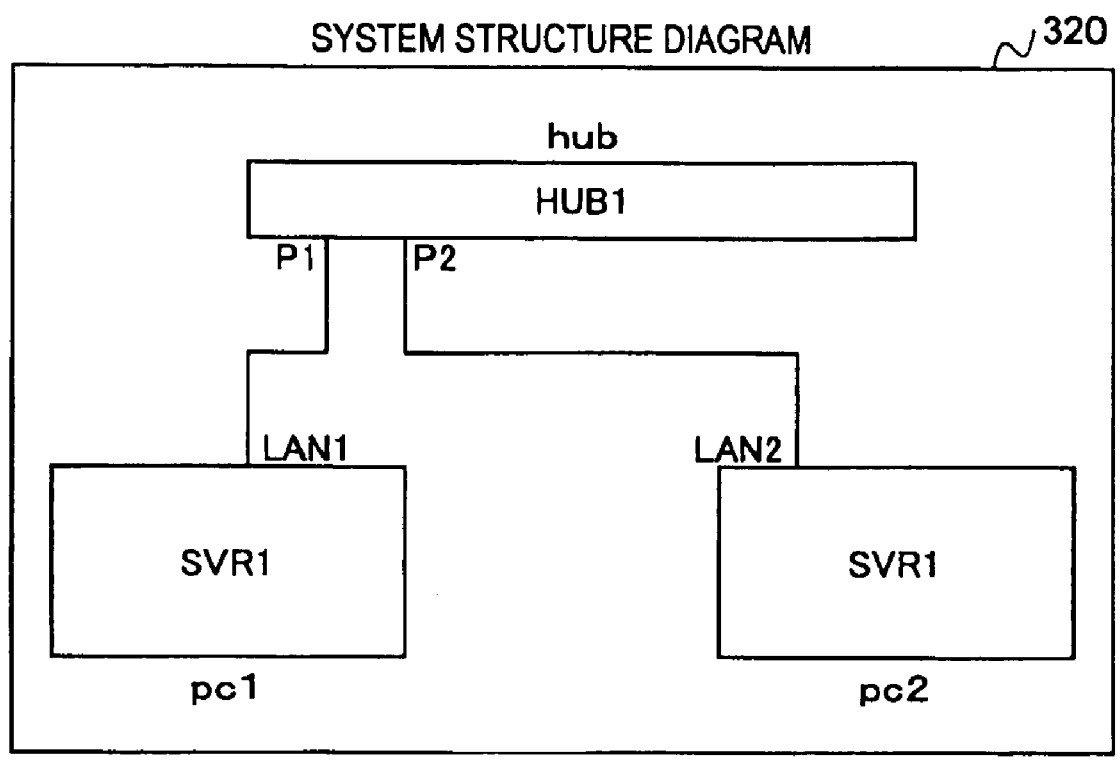
FIG. 24 shows an example of a system structure diagram.

FIG. 24 shows an example of the system structure diagram 320 created by the CAD device 300. In the system structure diagram 320 shown in FIG. 24, component codes (SVR1, HUB1) are shown in boxes indicating components and "pc1," "pc2" and "hub" shown outside the boxes are names of the components assigned during the design. In the system structure diagram 320 shown in FIG. 24, two server components of component code "SVR1" are connected to a hub component of component code "HUB1." "LAN1," "LAN2," "P1" and "P2" shown at the side of lines indicating a connection relationship between components are connector codes of connectors of components that become ends of the connection relationship.

Hereinafter, an example where a cable selection is made between pc1 and hub of the system structure diagram 320 shown in FIG. 24 will be explained. Here, suppose various tables are realized as tables of relational databases.

In the system structure diagram 320 shown in FIG. 24, connector "pc1.LAN1" and connector "hub.P1" are connected via a line. When the system is actually constructed, this line becomes a cable. Which cable can be used may be determined as will be explained below.

In the system structure diagram 320, a component of component code "SVR1" is used for the component having component name "pc1" and a component "HUB1" is used for a component having component name "hub." Characteristic scripts of the connectors are extracted from these connectors, for example, as follows.

---

Cable candidate array
= cable selection (["SVR1.LAN1", "HUB1.P1"]);

---

Here, ["SVR1.LAN1", "HUB1.P1"] is an argument of the cable selection function and denotes a connector name array. The process contents of the cable selection function are as shown in FIG. 18.

In "store registered cable in cable array (step S10)" in the algorithm of the cable selection processing shown in FIG. 18, the following SQL may be used.

--- select component code from component master table
where component type= 'cable';

---

The connector connectability judging processing (one of the connector name array and cable array is an argument) shown in FIG. 19 is executed on all cables in the cable array obtained and a judgment is made as to whether the selected cable is connectable to a given connector array or not.

The algorithm of the connector connectability judging processing shown in FIG. 19 describes "create cable connector array (step S30)", "create transfer function array (step S31)", "create connector array (step S34)" and these can be executed by the following SQL.

To acquire information on a cable connector from a cable, the following may be executed:

```
        select pd.connector ID, pd.fixed characteristics, pd.fixed judging
expression
            from component connector table pc, characteristic/judging
expression master table pd
            where
                pc.component code = 'code of given cable (e.g., CBL1)'
                and pc.characteristic code = pd.characteristic code;
```

Furthermore, to acquire a transfer function array from a cable, the following may be executed:

```
        select ctl.start point connector ID, ctl.end point connector ID,
                    tf.conversion type, tf.transfer
function
            from transfer function master table tf
                    , cable transfer function correspondence
table ctl
            where
                ctl.component code = 'code of given cable (e.g., CBL1)'
                and ctl.function code = tf.function code
                and tf.type = 'cable';
```

Furthermore, to generate a connector array, that is, convert each element of the connector name array to a script, the connector name is decomposed into a component code (SVR1, HUB1) portion and a connector code (LAN1, P1) portion. When, for example, a connector whose connector name is "SVR1.LAN1" is converted to a script of a characteristic/judging expression, the following may be executed:

```
        select pd.fixed characteristics, pd.fixed judging expression,
                    pd.variable characteristics,
        pd.variable judging expression
            from characteristic/judging expression master table pd,
        component connector table pc
            where pc.component code = 'SVR1'
                and pc.connector code= 'LAN1'
                and pc.characteristic code = pd.characteristic code;
```

When the connector transfer function cannot assume any

```
identical expression, information may be acquired by executing:
        select tf.conversion type, tf.transfer function
            from transfer function master table tf,
                    connector transfer function correspondence table ctl,
        component connector table pc
            where pc. component code = 'SVR1'
                and pc.connector code = 'LAN1'
                and pc.connector ID = ctl.connector ID
                and ctl.function code = tf.function code
                and tf.type = 'connector';
```

Since necessary scripts have been extracted from the library DB 200, if only a connectability judgment is made according to an algorithm, it is possible to judge whether the current cable of interest (e.g., cable of component code "CBL1") can be used for a connection between pc1.LAN1 and hub.P1.

Finally, when the above processing is executed using a cable of component code "CBL1," both the characteristic transferred from the connector of a server of component code "SVR1" and the characteristics with the connector of the hub of component code "HUB1" are "true" for the items LANSP and LANPIN of the judging expression, and therefore the cable of component code "CBL1" is selected as a cable candidate. When the same process is performed using a cable of component code "CBL2," LANSP is compatible with the judging expression becoming "true" but since LANPIN is not compatible, the cable of component code "CBL2" is not selected as a cable candidate. A more detailed operation is as described in the explanation of "definition/operation example of variable characteristic script" using above FIG. 5 and FIG. 9 or the like.

Since the actual algorithm takes into consideration symmetry of operation rather than ease of understanding, the actual algorithm is different from the operation example presented here in transfer and judgment methods, but has the same effects.

The above processing for a cable selection can be realized using a computer and software program, and the program can be provided recorded in a computer-readable recording medium or provided via a network.

According to the present invention, using a new script, it is possible to "freely describe shape properties" of a connector, "freely describe logical properties," further "freely describe compatibility (connection consistency) of two shape properties," "freely describe compatibility (connection consistency) of two logical properties" and "define a method of transferring logical properties." Therefore, by defining in script beforehand, properties of connectors and cables used for a system structure diagram, it is possible to check connection consistency and select cable candidates for even a new connector or cable and new signal protocol using a general-purpose check engine that analyzes the script by only adding definition information in script.

The present invention is a computer application technique that checks validity of a connection from a connection line between components described in a system structure diagram designed using CAD or the like, automatically selects and presents suitable cable candidates that are connectable.

All examples and conditional language recited herein are intended for pedagogical purposes to aid the reader in understanding the invention and the concepts contributed by the inventor to furthering the art, and to be construed as being without limitation to such specifically recited examples and conditions, nor does the organization of such examples in the specification relate to a showing of the superiority and inferiority of the invention. Although the embodiment(s) of the present invention have been described in detail, it should be understood that the various changes, substitutions, and alterations could be made hereto without departing from the spirit and scope of the invention.

What is claimed is:

1. A connection consistency check processing method for a computer to check whether components linked by lines in a system structure diagram are actually connectable to each other or not based on electronic information of the system structure diagram, the method comprising:

extracting, using a processor, a connector group of components to be connected, linked by lines on the system structure diagram from the electronic information of the system structure diagram;

reading, for the respective extracted connectors to be connected with respect to connectors used to connect components, scripts describing fixed characteristics, a connection judging expression of the fixed characteristics, variable characteristics, and a connection judging expression of the variable characteristics from a characteristic/judging expression script storage unit that stores definition information describing in a script according to a predetermined grammatical rule, fixed characteristics showing shape and state characteristics, a connection judging expression of the fixed characteristics to judge whether the fixed characteristics are connectable values or not, variable characteristics showing electric characteristics and a connection judging expression of the variable characteristics to judge whether the variable characteristics are connectable values or not;

evaluating, for each cable registered beforehand, values of the fixed characteristics of the connectors to be connected according to the connection judging expression of the fixed characteristics and judging whether connections are good or not, looking up a transfer function script storage unit that stores definition information describing in a script according to a predetermined grammatical rule, a transfer function that shows how to transfer the variable characteristics and the connection judging expression of the variable characteristics between connectors to be connected or between one end and an other end of a cable with respect to connectors and cables registered beforehand, deforming the variable characteristics and the connection judging expression of the variable characteristics of the connection source according to the transfer function and transferring the variable characteristics and the connection judging expression of the variable characteristics to a transfer target, which is one of the connectors to be connected or the other end of the cable, repeating processing of evaluating the variable characteristics according to the connection judging expression of the variable characteristics and judging whether connections are good or not for each connected portion, and thereby certifying that there is connection consistency when a cable judged to be connectable in all the processing exists, and certifying that there is no connection consistency when no cable judged to be connectable in all the processing exists; and outputting information on whether there is connection consistency or not.

2. The connection consistency check processing method according to claim 1, comprising:

checking whether a connector of a component to be connected extracted from the electronic information of the system structure diagram is directly connectable without using any cable by analyzing scripts describing the fixed characteristics, connection judging expression of the fixed characteristics, variable characteristics and a connection judging expression of the variable characteristics of the connector, and outputting information indicating that the connector is directly connectable when both judging results of the connection judging expression of the fixed characteristics and the connection judging expression of the variable characteristics are "true."

3. A cable selection processing method for a computer to select a cable candidate for connecting components with each other linked by lines in a system structure diagram based on electronic information of the system structure diagram, the method comprising:

extracting, using a processor, a connector group of components to be connected, linked by lines on the system structure diagram from the electronic information of the system structure diagram;

reading, for the respective extracted connectors to be connected with respect to connectors used to connect components, scripts describing fixed characteristics, a connection judging expression of the fixed characteristics, variable characteristics, and a connection judging expression of the variable characteristics from a characteristic/judging expression script storage unit that stores definition information describing in a script according to a predetermined grammatical rule, fixed characteristics showing shape and state characteristics, a connection judging expression of the fixed characteristics to judge whether the fixed characteristics are connectable values or not, variable characteristics showing electric characteristics and a connection judging expression of the variable characteristics to judge whether the variable characteristics are connectable values or not;

evaluating, for each cable registered beforehand, values of the fixed characteristics of the connectors to be connected according to the connection judging expression of the fixed characteristics and judging whether connections are good or not, looking up a transfer function script storage unit that stores definition information describing in a script according to a predetermined grammatical rule, a transfer function that shows how to transfer the variable characteristics and the connection judging expression of the variable characteristics between connectors to be connected or between one end and an other end of a cable with respect to connectors and cables registered beforehand, deforming the variable characteristics and the connection judging expression of the variable characteristics of the connection source according to the transfer function and transferring the variable characteristics and the connection judging expression of the variable characteristics to a transfer target, which is one of the connectors to be connected or the other end of the cable, repeating processing of evaluating the variable characteristics according to the connection judging expression of the variable characteristics and judging whether their connections are good or not for each connected portion, and thereby selecting cables judged to be connectable in all the processing as connectable cable candidates; and outputting the connectable cable candidates.

4. A design confirmation processing device to check whether components linked by lines in a system structure diagram are actually connectable with each other or not based on electronic information of the system structure diagram, the device comprising:

a characteristic/judging expression script storage unit that stores, for a connector used to connect components, definition information describing in a script according to a predetermined grammatical rule, fixed characteristics showing shape and state characteristics, a connection judging expression of the fixed characteristics to judge whether the fixed characteristics are connectable values or not, variable characteristics showing electric characteristics and a connection judging expression of the variable characteristics to judge whether the variable characteristics are connectable values or not;

a transfer function script storage unit that stores, for connectors and cables, definition information describing in a script according to a predetermined grammatical rule, a transfer function that shows how to transfer the variable characteristics and the connection judging expression of the variable characteristics between connectors to be connected or between one end and an other end of a cable;

a processing unit that extracts a connector group of components to be connected linked by lines on the system structure diagram from the electronic information of the system structure diagram;

a processing unit that reads, for the respective extracted connectors to be connected, scripts describing fixed characteristics, a connection judging expression of the fixed characteristics, variable characteristics and a connection judging expression of the variable characteristics from the characteristic/judging expression script storage unit;

a processing unit that evaluates, for each cable registered beforehand, values of the fixed characteristics of the connectors to be connected according to the connection judging expression of the fixed characteristics and judges whether connections are good or not, deforms the variable characteristics and the connection judging expression of the variable characteristics of the connection source according to the transfer function and transfers the variable characteristics and the connection judging expression of the variable characteristics to a transfer target, which is one of the connectors to be connected or the other end of the cable, repeats processing of evaluating the variable characteristics according to the connection judging expression of the variable characteristics and judging whether connections are good or not for each connected portion, and thereby certifies that there is connection consistency when a cable judged to be connectable in all the processing exists, and certifies that there is no connection consistency when no cable judged to be connectable in all the processing exists; and a processing unit that outputs information as to whether there is connection consistency or not.

5. The design confirmation processing device according to claim 4, comprising a processing unit that checks whether a connector of a component to be connected extracted from the electronic information of the system structure diagram is directly connectable without using any cable or not by analyzing scripts describing the fixed characteristics, connection judging expression of the fixed characteristics, variable characteristics and a connection judging expression of the variable characteristics of the connector and outputs information indicating that the connector is directly connectable when both judging results of the connection judging expression of the fixed characteristics and the connection judging expression of the variable characteristics are "true."

6. A design confirmation processing device to select cable candidates for connecting components linked by lines in a system structure diagram based on electronic information of the system structure diagram, the device comprising:

a characteristic/judging expression script storage unit that stores, for a connector used to connect components, definition information describing in a script according to a predetermined grammatical rule, fixed characteristics showing shape and state characteristics, a connection judging expression of the fixed characteristics to judge whether the fixed characteristics are connectable values or not, variable characteristics showing electric characteristics and a connection judging expression of the variable characteristics to judge whether the variable characteristics are connectable values or not;

a transfer function script storage unit that stores, for connectors and cables, definition information describing in a script according to a predetermined grammatical rule, a transfer function that shows how to transfer the variable characteristics and the connection judging expression of the variable characteristics between connectors to be connected or between one end and an other end of a cable;

a processing unit that extracts a connector group of components to be connected, linked by lines on the system structure diagram from the electronic information of the system structure diagram;

a processing unit that reads, for the respective extracted connectors to be connected, scripts describing fixed characteristics, a connection judging expression of the fixed characteristics, variable characteristics and a connection judging expression of the variable characteristics from the characteristic/judging expression script storage unit;

a processing unit that evaluates, for each cable registered beforehand, values of the fixed characteristics of the connectors to be connected according to the connection judging expression of the fixed characteristics and judges whether connections are good or not, deforms the variable characteristics and the connection judging expression of the variable characteristics of the connection source according to the transfer function and transfers the variable characteristics and the connection judging expression of the variable characteristics to a transfer target, which is one of the connectors to be connected or the other end of the cable, repeats processing of evaluating the variable characteristics according to the connection judging expression of the variable characteristics and judging whether connections are good or not for each connected portion, and thereby selects cables judged to be connectable in all the processing as connectable cable candidates; and a processing unit that outputs the connectable cable candidates.

7. A non-transitory computer readable medium that records a design confirmation processing program, causing a computer to execute processing of checking whether components linked by lines in a system structure diagram are actually connectable with each other based on electronic information of the system structure diagram, comprising:

extracting a connector group of components to be connected linked by lines on the system structure diagram from the electronic information of the system structure diagram;

reading, for the respective extracted connectors to be connected with respect to connectors used to connect components, scripts describing fixed characteristics, a connection judging expression of the fixed characteristics, variable characteristics, and a connection judging expression of the variable characteristics from a characteristic/judging expression script storage unit that stores definition information describing in a script according to a predetermined grammatical rule, fixed characteristics showing shape and state characteristics, a connection judging expression of the fixed characteristics to judge whether the fixed characteristics are connectable values or not, variable characteristics showing electric characteristics and a connection judging expression of the variable characteristics to judge whether the variable characteristics are connectable values or not;

evaluating, for each cable registered beforehand, values of the fixed characteristics of the connectors to be connected according to the connection judging expression of the fixed characteristics and judging whether their connections are good or not, looking up a transfer function script storage unit that stores definition information describing in a script according to a predetermined grammatical rule, a transfer function that shows how to transfer the variable characteristics and the connection judging expression of the variable characteristics between connectors to be connected or between one end and an other end of a cable with respect to connectors and cables registered beforehand, deforming the variable characteristics and the connection judging expression of the variable characteristics of the connection source according to the transfer function and transferring the variable characteristics and the connection judging expression of the variable characteristics to a transfer target, which is one of the connectors to be connected or the other end of the cable, repeating processing of evaluating the variable characteristics according to the connection judging expression of the variable characteristics and judging whether connections are good or not for each connected portion, and thereby certifying, when cables judged to be connectable in all the processing exist, that there is connection consistency and certifying, when no cables judged to be connectable in all the processing exist, that there is no connection consistency; and outputting information as to whether there is connection consistency or not.

8. The non-transitory computer readable medium that records a design confirmation processing program according to claim 7, comprising:

checking whether a connector of a component to be connected extracted from the electronic information of the system structure diagram is directly connectable without using any cable or not by analyzing scripts describing the fixed characteristics, connection judging expression of the fixed characteristics, variable characteristics and a connection judging expression of the variable characteristics of the connector, and outputting information indicating that the connector is directly connectable when both judging results of the connection judging expression of the fixed characteristics and the connection judging expression of the variable characteristics are "true."

9. A non-transitory computer readable medium that records a design confirmation processing program, causing a computer to execute processing of selecting cable candidates for connecting components linked by lines in a system structure diagram based on electronic information of the system structure diagram, comprising:

extracting a connector group of components to be connected, linked by lines on the system structure diagram from the electronic information of the system structure diagram;

reading, for the respective extracted connectors to be connected with respect to connectors used to connect components, scripts describing fixed characteristics, a connection judging expression of the fixed characteristics, variable characteristics, and a connection judging expression of the variable characteristics from a characteristic/judging expression script storage unit that stores definition information describing in a script according to a predetermined grammatical rule, fixed characteristics showing shape and state characteristics, a connection judging expression of the fixed characteristics to judge whether the fixed characteristics are connectable values or not, variable characteristics showing electric characteristics and a connection judging expression of the variable characteristics to judge whether the variable characteristics are connectable values or not;

evaluating, for each cable registered beforehand, values of the fixed characteristics of the connectors to be connected according to the connection judging expression of the fixed characteristics and judging whether connections are good or not, looking up a transfer function script storage unit that stores definition information describing in a script according to a predetermined grammatical rule, a transfer function that shows how to transfer the variable characteristics and the connection judging expression of the variable characteristics between connectors to be connected or between one end and an other end of a cable with respect to connectors and cables registered beforehand, deforming the variable characteristics and the connection judging expression of the variable characteristics of the connection source according to the transfer function and transferring the variable characteristics and the connection judging expression of the variable characteristics to a transfer target, which is one of the connectors to be connected or the other end of the cable, repeating processing of evaluating the variable characteristics according to the connection judging expression of the variable characteristics and judging whether connections are good or not for each connected portion, and thereby selecting cables judged to be connectable in all the processing as connectable cable candidates; and outputting the connectable cable candidates.

\* \* \* \* \*